(12) United States Patent
Baldemair et al.

(10) Patent No.: US 8,705,477 B2
(45) Date of Patent: Apr. 22, 2014

(54) SIMULTANEOUS REPORTING OF ACK/NACK AND CHANNEL-STATE INFORMATION USING PUCCH FORMAT 3 RESOURCES

(75) Inventors: Robert Baldemair, Solna (SE); Jung-Fu Cheng, Fremont, CA (US); Mattias Frenne, Uppsala (SE); Daniel Larsson, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 8 days.

(21) Appl. No.: 13/499,786

(22) PCT Filed: Feb. 14, 2012

(86) PCT No.: PCT/SE2012/050150
§ 371 (c)(1),
(2), (4) Date: Apr. 2, 2012

(87) PCT Pub. No.: WO2013/051981
PCT Pub. Date: Apr. 11, 2013

(65) Prior Publication Data
US 2013/0208665 A1 Aug. 15, 2013

Related U.S. Application Data

(60) Provisional application No. 61/542,879, filed on Oct. 4, 2011.

(51) Int. Cl.
*H04W 72/04* (2009.01)
*H04W 88/00* (2009.01)
(52) U.S. Cl.
CPC ................................ *H04W 72/0413* (2013.01)
USPC ........................................... 370/329; 370/336

(58) Field of Classification Search
None
See application file for complete search history.

(56) References Cited

U.S. PATENT DOCUMENTS

| | | | | |
|---|---|---|---|---|
| 2008/0165893 | A1* | 7/2008 | Malladi et al. ................. | 375/299 |
| 2010/0124291 | A1* | 5/2010 | Muharemovic et al. ....... | 375/260 |
| 2010/0195629 | A1* | 8/2010 | Chen et al. ..................... | 370/336 |
| 2011/0243066 | A1* | 10/2011 | Nayeb Nazar et al. ........ | 370/328 |
| 2011/0249578 | A1* | 10/2011 | Nayeb Nazar et al. ........ | 370/252 |
| 2011/0280222 | A1* | 11/2011 | Nam et al. ..................... | 370/335 |
| 2011/0292887 | A1 | 12/2011 | Baldemair et al. | |

OTHER PUBLICATIONS

LG, Remaining Issues on Resource Allocation for TDD PUCCH format 3, R1-111692, published on May 13, 2011.*

(Continued)

*Primary Examiner* — Hassan Kizou
*Assistant Examiner* — Tejis Daya
(74) *Attorney, Agent, or Firm* — Murphy, Bilak & Homiller, PLLC

(57) ABSTRACT

A new uplink control channel capability is introduced to enable a mobile terminal (1500, 1600) to simultaneously report multiple packet receipt status bits and channel-condition bits. In an example embodiment, an encoding circuit (1100) encodes the hybrid-ARQ ACK/NACK bits using a first encoder (1110) and separately encodes the channel-state information bits using a second encoder (1120). The encoded hybrid-ARQ ACK/NACK bits and the encoded channel-state information bits are interleaved, and the interleaved, encoded bits are transmitted in physical control channel resources of a first uplink subframe, on a single carrier. In some embodiments, the interleaved, encoded bits are transmitted in two slots of the first uplink subframe, the two slots having different subcarrier frequencies. In these embodiments, each slot carries a plurality of the encoded hybrid-ARQ ACK/NACK bits and a plurality of the encoded channel-state information bits.

28 Claims, 14 Drawing Sheets

(56) References Cited

OTHER PUBLICATIONS

3RD Generation Partnership Project. "Evaluation of PUCCH Proposals for Carrier Aggregation." 3GPP TSG-RAN WG1 #61bis, R1-103507, Dresden, Germany, Jun. 28-Jul. 2, 2010.

3RD Generation Partnership Project. "Further Details on Slow Codebook Adaptation for PUCCH Format 3." 3GPP TSG-RAN WG1 #62bis, R1-105312, Xi'an, China, Oct. 11-15, 2010.

3RD Generation Partnership Project. "PUCCH Power Control for DL CA." 3GPP TSG RAN WG1 #62bis, R1-105367, Xian, China, Oct. 11-15, 2010.

3RD Generation Partnership Project. "Mapping Tables for Format 1b with Channel Selection." R1-105476, Xi'An, China, Oct. 11-15, 2010.

3RD Generation Partnership Project. "Way Forward on A/N Mapping Table for Channel Selection." TSG-RAN WG1 Meeting #62bis, R1-105807, Xi'an, P.R. China, Oct. 11-15, 2010.

3RD Generation Partnership Project. "Report of 3GPP TSG RAN WG2 meeting #69." TSG-RAN Working Group 2 meeting #69, R2-101978, Beijing, China, Apr. 12-16, 2010.

3RD Generation Partnership Project. 3GPP TS 36.211, V10.3.0 (Sep. 2011). 3rd Generation Partnership Project; Technical Specification Group Radio Access Network; Evolved Universal Terrestrial Radio Access (E-UTRA); Physical Channels and Modulation (Release 10). Sep. 2011.

3RD Generation Partnership Project. 3GPP TS 36.212, V10.3.0 (Sep. 2011). 3rd Generation Partnership Project; Technical Specification Group Radio Access Network; Evolved Universal Terrestrial Radio Access (E-UTRA); Multiplexing and channel coding (Release 10). Sep. 2011.

3RD Generation Partnership Project. 3GPP TS 36.213, V10.3.0 (Sep. 2011). 3rd Generation Partnership Project; Technical Specification Group Radio Access Network; Evolved Universal Terrestrial Radio Access (E-UTRA); Physical layer procedures (Release 10). Sep. 2011.

3RD Generation Partnership Project. "Details of CA PUCCH for UE supporting more than 4 A/N bits." 3GPP TSG-RAN WG1 #62, R1-104978, Aug. 23-27, 2010, pp. 1-5, Madrid, Spain.

3RD Generation Partnership Project. "Large ACK/NACK payload in support of CA in TDD." 3GPP TSG RAN WG1 Meeting #62bis, R1-105714, Oct. 11-15, 2010, pp. 1-6, Xi'an, China.

3RD Generation Partnership Project. "Performance of CQI and A/N multiplexed on PUCCH." 3GPP TSG-RAN WG1 Meeting #63, R1-105948, Nov. 15-19, 2010, pp. 1-10, Jacksonville, USA.

3RD Generation Partnership Project. "Simultaneous CQI and AIN with the baseline of no carrier-domain AIN bundling." 3GPP TSG RAN WGl meeting #63bis, R1-110011, Jan. 14-21, 2011, pp. 1-6, Dublin, Ireland.

3RD Generation Partnership Project. "Concatenation of Dual RM Coding Bits for UCI on PUSCH." 3GPP TSG RAN WG1 Meeting #63bis, R1-110274, Jan. 17-21, 2011, pp. 1-7, Dublin, Ireland.

3RD Generation Partnership Project. "Remaining details on UCI combination." 3GPP TSG RAN WG1 #65, R1-111616, May 9-13, 2011, pp. 1-10, Barcelona, Spain.

3RD Generation Partnership Project. "Joint transmission of ACK/NACK and SR or CSI with PUCCH format 3 and channel selection." 3GPP TSG-RAN WG1 Meeting #65, R1-112014, May 9-13, 2011, pp. 1-7, Barcelona, Spain.

Zyren, J. "Overview of the 3GPP Long Term Evolution Physical Layer." Freescale Semiconductor, Inc., XP-002458194, Jul. 2007, pp. 1-27.

* cited by examiner

SIMULTANEOUS REPORTING OF ACK/NACK AND CHANNEL-STATE INFORMATION USING PUCCH FORMAT 3 RESOURCES

RELATED APPLICATION

This application claims the benefit of U.S. Provisional Patent Application 61/542,879, filed 4 Oct. 2011.

TECHNICAL FIELD

The present invention relates generally to carrier aggregation in a mobile communication system and, more particularly, to an efficient use of resources for the physical uplink control channel in wireless systems using carrier aggregation.

BACKGROUND

Carrier aggregation is one of the new features recently developed by the members of the 3rd-Generation Partnership Project (3GPP) for so-called Long Term Evolution (LTE) systems, and is standardized as part of LTE Release 10, which is also known as LTE-Advanced. An earlier version of the LTE standards, LTE Release 8, supports bandwidths up to 20 MHz. In LTE-Advanced, bandwidths up to 100 MHz are supported. The very high data rates contemplated for LTE-Advanced will require an expansion of the transmission bandwidth. In order to maintain backward compatibility with LTE Release 8 mobile terminals, the available spectrum is divided into Release 8—compatible chunks called component carriers. Carrier aggregation enables bandwidth expansion beyond the limits of LTE Release 8 systems by allowing mobile terminals to transmit data over multiple component carriers, which together can cover up to 100 MHz of spectrum. Importantly, the carrier aggregation approach ensures compatibility with earlier Release 8 mobile terminals, while also ensuring efficient use of a wide carrier by making it possible for legacy mobile terminals to be scheduled in all parts of the wideband LTE-Advanced carrier.

The number of aggregated component carriers, as well as the bandwidth of the individual component carrier, may be different for uplink (UL) and downlink (DL) transmissions. A carrier configuration is referred to as "symmetric" when the number of component carriers in each of the downlink and the uplink are the same. In an asymmetric configuration, on the other hand, the numbers of component carriers differ between the downlink and uplink. The number of component carriers configured for a geographic cell area may be different from the number of component carriers seen by a given mobile terminal. A mobile terminal, for example, may support more downlink component carriers than uplink component carriers, even though the same number of uplink and downlink component carriers may be offered by the network in a particular area.

LTE systems can operate in either Frequency-Division Duplex (FDD) mode or Time-Division Duplex (TDD) mode. In FDD mode, downlink and uplink transmissions take place in different, sufficiently separated, frequency bands. In TDD mode, on the other hand, downlink and uplink transmission take place in different, non-overlapping time slots. Thus, TDD can operate in unpaired spectrum, whereas FDD requires paired spectrum. TDD mode also allows for different asymmetries in terms of the amount of resources allocated for uplink and downlink transmission, respectively, by means of different downlink/uplink configurations. These differing configurations permit the shared frequency resources to be allocated to downlink and uplink use in differing proportions. Accordingly, uplink and downlink resources can be allocated asymmetrically for a given TDD carrier.

One consideration for carrier aggregation is how to transmit control signaling from the mobile terminal on the uplink to the wireless network. Uplink control signaling may include acknowledgement (ACK) and negative-acknowledgement (NACK) signaling for hybrid automatic repeat request (Hybrid ARQ, or HARQ) protocols, channel state information (CSI) and channel quality information (CQI) reporting for downlink scheduling, and scheduling requests (SRs) indicating that the mobile terminal needs uplink resources for uplink data transmissions. In the carrier aggregation context, one solution would be to transmit the uplink control information on multiple uplink component carriers associated with different downlink component carriers. However, this option is likely to result in higher mobile terminal power consumption and a dependency on specific mobile terminal capabilities. Accordingly, improved techniques are needed for managing the transmission of uplink control-channel information in systems that employ carrier aggregation.

SUMMARY

Even with the several PUCCH formats already standardized by 3GPP, problems remain. One problem occurs when a periodic channel-state-information (CSI) report and multiple ACK/NACK bits are scheduled for transmission by a mobile terminal in the same uplink subframe. According to the Release 8 specifications for LTE, a UE can be configured to either simultaneously transmit periodic CSI and ACK/NACK for a single carrier on a Physical Uplink Control Channel (PUCCH), using one of two formats known as PUCCH Format 2a and PUCCH Format 2b, or to drop periodic CSI and only transmit ACK/NACK on PUCCH in case of collisions. In Release 10, however, simultaneous transmission of periodic CSI information and ACK/NACK bits for multiple cells is only possible if simultaneous transmission on PUCCH and the shared data channel, the Physical Uplink Shared Channel (PUSCH), is configured. Thus, in the event of a collision between multi-cell ACK/NACK and periodic CSI the latter is dropped and only the multi-cell ACK/NACK is transmitted.

Periodic CSI reports for multiple cells are handled in Release 10 with time-shifted reporting times, to minimize collisions among CSI reports. To maintain roughly the same CSI periodicity per cell, it is obvious that periodic CSI reports are transmitted more frequently than in Release 8 systems. In each subframe without PUSCH transmission where periodic CSI and multi-cell ACK/NACK collide, the periodic CSI are dropped. Since CSI reports are required for link adaptation, reduced CSI feedback degrades downlink performance. This is particularly a problem for TDD, where only a minority of the available subframes may be uplink subframes. This means that the opportunities to feed back CSI are fewer in TDD than in FDD. Thus, dropping CSI reports leads to longer CSI feedback delays than in FDD.

In several embodiments of the present invention, these problems are addressed by introducing a new uplink control channel capability that enables a mobile terminal to simultaneously report to the radio network multiple packet receipt status bits, (e.g., ACK/NACK bits) and channel-condition bits (e.g., CSI reports). In particular, a new PUCCH design is described, to enable simultaneous transmission of multi-cell ACK/NACK (multi-cell includes ACK/NACK from a single secondary component carrier as well) and CSI reports. The transmission scheme is designed so that a mobile terminal can use the PUCCH Format 3 resources for "normal" PUCCH format 3 transmissions as well as to carry ACK/NACK and CSI bits that are handled according to the detailed techniques described in the disclosure. This is done to reduce additional resource signaling—thus, a mobile terminal already configured with PUCCH Format 3 resources can reuse these resources.

In an example embodiment implemented in a mobile terminal, the mobile terminal encodes the hybrid-ARQ ACK/NACK bits using a first encoder and separately encodes the channel-state information bits using a second encoder. Next, the encoded hybrid-ARQ ACK/NACK bits and the encoded channel-state information bits are interleaved, and the interleaved, encoded bits are transmitted in physical control channel resources of a first uplink subframe, on a single carrier. In some embodiments, the interleaved, encoded bits are transmitted in two slots of the first uplink subframe, the two slots having different subcarrier frequencies. In these embodiments, each slot carries a plurality of the encoded hybrid-ARQ ACK/NACK bits and a plurality of the encoded channel-state information bits. In some embodiments, the interleaved, encoded bits are grouped into multi-bit modulation symbols for transmission and the interleaver ensures that each of the multi-bit modulation symbols includes encoded hybrid-ARQ ACK/NACK bits or encoded channel-state information bits, but not both.

In some embodiments, the encoded hybrid-ARQ ACK/NACK bits and the encoded channel-state information bits are scrambled, prior to interleaving, using one or more scrambling sequences that are configured by RRC. In other embodiments, a scrambling operation is performed after the interleaving, prior to transmission, again using one or more configured scrambling sequences. In some embodiments, a scheduling request bit is jointly coded with the hybrid-ARQ ACK/NACK bits or the channel-state information bits.

The techniques summarized above can be applied in an LTE context in such a manner that the encoded, interleaved bits are transmitted using a Physical Uplink Control Channel (PUCCH) Format 3 resource. Further, these techniques can be combined with other schemes and formats for transmitting different numbers and/or combinations of ACK/NACK bits and others. For example, simultaneous transmissions of channel-state information and ACK/NACK bits for only a single component carrier may be handled differently. So, for a second subframe for which both a transmission of second channel-state information and a transmission of one or two hybrid-ARQ ACK/NACK bits for only a downlink primary cell transmission are scheduled, the second channel-state information and the one or two hybrid-ARQ ACK/NACK bits for the downlink primary cell transmission can be transmitted using a pre-configured PUCCH format 2 resource in the second subframe. Alternatively, for a second subframe for which both a transmission of second channel-state information and a transmission of one or two hybrid-ARQ ACK/NACK bits for only a downlink primary cell transmission are scheduled, the second channel-state information may be dropped, and only the one or two hybrid-ARQ ACK/NACK bits for the downlink primary cell transmission are transmitted, using a PUCCH format 1 resource in the second uplink subframe.

The specific behavior of the mobile terminal in these scenarios may depend, in some embodiments, on RRC configuration of the mobile terminal. Thus, the methods summarized above may be preceded by a step in which the mobile terminal first determines that it has been configured, via received signaling, for simultaneous transmission of hybrid-ARQ ACK/NACK bits and periodic channel-state information bits.

As noted earlier, the specific coding and formatting of the ACK/NACK bits and channel-state information bits may vary. In some embodiments, for example, encoding the hybrid-ARQ ACK/NACK bits using the first encoder comprises selecting a number of coded ACK/NACK bits for transmission as a function of a number of hybrid-ARQ ACK/NACK bits for the multiple downlink subframes or multiple downlink carriers, or both. The selected number of coded ACK/NACK bits may depend on a number of hybrid-ARQ ACK/NACK bits after ACK/NACK bundling, in scenarios where ACK/NACK bundling is used.

Encoding the hybrid-ARQ ACK/NACK bits using the first encoder may be followed by rate-matching of an initial set of coded ACK/NACK bits, to obtain a selected number of coded ACK/NACK bits, in some embodiments. This rate-matching may comprise, for example, puncturing of the initial set of coded ACK/NACK bits or cyclic rate-matching of the initial set of coded ACK/NACK bits to obtain the selected number of coded ACK/NACK bits.

In some embodiments, the handling of channel-state-information bits depends on decisions taken with respect to processing the ACK/NACK bits. Thus, for example, the number of encoded channel-state-information bits for transmission may be determined as a function of the selected number of coded ACK/NACK bits for transmission. In some cases, the channel-state information bits are prioritized, and only the highest priority channel-state information bits selected for encoding and transmitting.

Complementary techniques for receiving and processing information transmitted according to the techniques described above are also disclosed in detail below. In addition, mobile terminal apparatus and base station apparatus adapted to carry out any of these techniques are disclosed. Of course, the present invention is not limited to the above-summarized features and advantages. Indeed, those skilled in the art will recognize additional features and advantages upon reading the following detailed description, and upon viewing the accompanying drawings.

DETAILED DESCRIPTION

Figure 1:
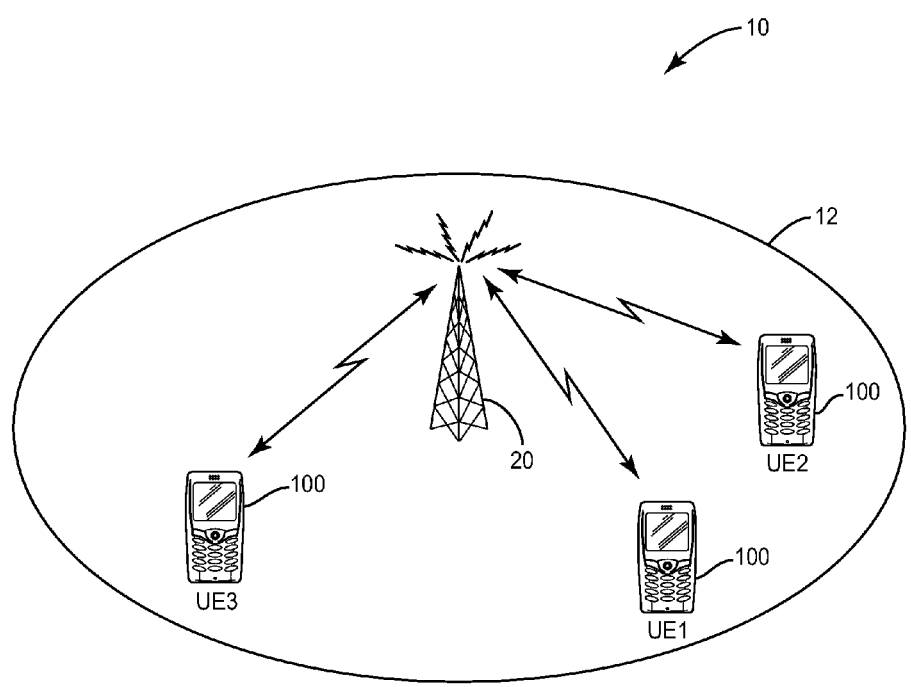
FIG. 1 illustrates an example of a mobile communication system.

Referring now to the drawings, FIG. 1 illustrates an exemplary mobile communication network 10 for providing wireless communication services to mobile terminals 100. Three mobile terminals 100, which are referred to as "user equipment" or "UE" in LTE terminology, are shown in FIG. 1. The mobile terminals 100 may comprise, for example, cellular telephones, personal digital assistants, smart phones, laptop computers, handheld computers, or other devices with wireless communication capabilities. The mobile communication network 10 comprises a plurality of geographic cell areas or sectors 12. Each geographic cell area or sector 12 is served by a base station 20, which is referred to in LTE as a NodeB or Evolved NodeB (eNodeB). One base station 20 may provide service in multiple geographic cell areas or sectors 12. The mobile terminals 100 receive signals from base station 20 on one or more downlink (DL) channels, and transmit signals to the base station 20 on one or more uplink (UL) channels.

For illustrative purposes, several embodiments of the present invention will be described in the context of a Long-Term Evolution (LTE) system. Those skilled in the art will appreciate, however, that several embodiments of the present invention may be more generally applicable to other wireless communication systems, including, for example, WiMax (IEEE 802.16) systems.

Figure 2:
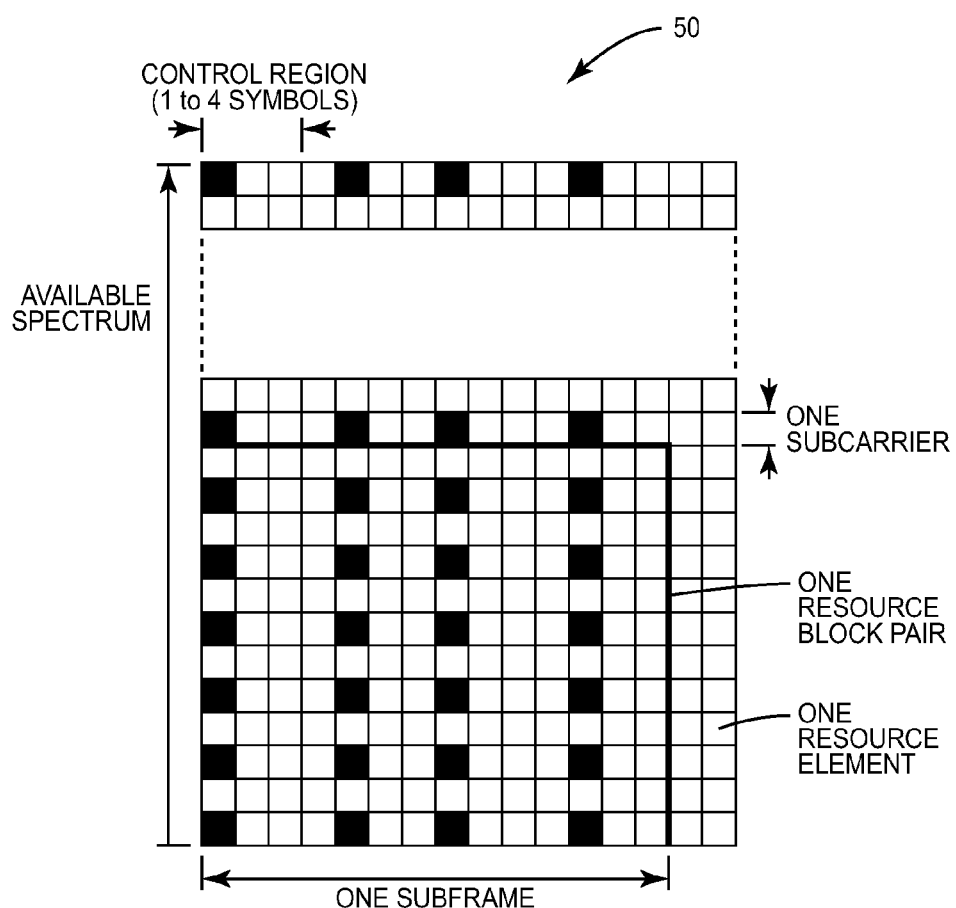
FIG. 2 illustrates a grid of time-frequency resources for a mobile communication system that uses OFDM.

LTE uses Orthogonal Frequency Division Multiplexing (OFDM) in the downlink and Discrete Fourier Transform (DFT)-spread OFDM in the uplink. The basic LTE downlink physical resource can be viewed as a time-frequency grid. FIG. 2 illustrates a portion of the available spectrum of an exemplary OFDM time-frequency grid 50 for LTE. Generally speaking, the time-frequency grid 50 is divided into one millisecond subframes. Each subframe includes a number of OFDM symbols. For a normal cyclic prefix (CP) length, suitable for use in situations where multipath dispersion is not expected to be extremely severe, a subframe consists of fourteen OFDM symbols. A subframe has only twelve OFDM symbols if an extended cyclic prefix is used. In the frequency domain, the physical resources are divided into adjacent subcarriers with a spacing of 15 kHz. The number of subcarriers varies according to the allocated system bandwidth. The smallest element of the time-frequency grid 50 is a resource element. A resource element consists of one OFDM subcarrier during one OFDM symbol interval.

Resource elements are grouped into resource blocks, where each resource block in turn consists of twelve OFDM subcarriers, within one of two equal-length slots of a subframe. FIG. 2 illustrates a resource block pair, comprising a total of 168 resource elements.

Downlink transmissions are dynamically scheduled, in that in each subframe the base station transmits control information identifying the mobile terminals to which data is transmitted and the resource blocks in which that data is transmitted, for the current downlink subframe. This control signaling is typically transmitted in a control region, which occupies the first one, two, three, or four OFDM symbols in each subframe. A downlink system with a control region of three OFDM symbols is illustrated in FIG. 2. The dynamic scheduling information is communicated to the UEs ("user equipment," 3GPP terminology for a mobile station) via a Physical Downlink Control Channel (PDCCH) transmitted in the control region. After successful decoding of a PDCCH, the UE performs reception of traffic data from the Physical Downlink Shared Channel (PDSCH) or transmission of traffic data on the Physical Uplink Shared Channel (PUSCH), according to pre-determined timing specified in the LTE specifications.

Figure 3:
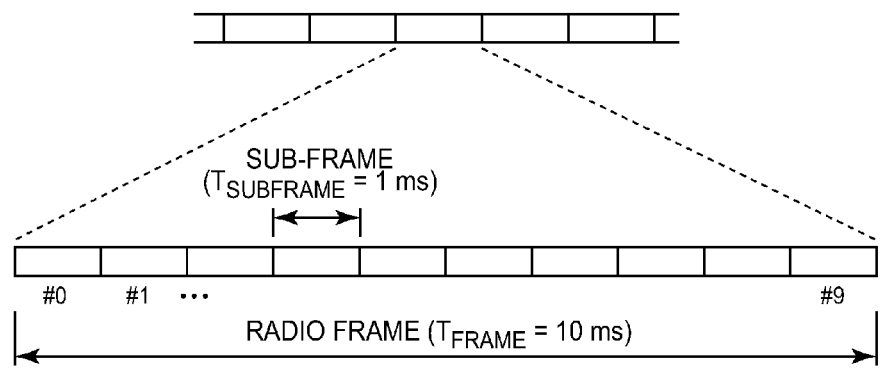
FIG. 3 illustrates the time-domain structure of an LTE signal.

As shown in FIG. 3, LTE downlink transmissions are further organized into radio frames of 10 milliseconds, in the time domain, each radio frame consisting of ten subframes. Each subframe can further be divided into two slots of 0.5 milliseconds duration. Furthermore, resource allocations in LTE are often described in terms of resource blocks, where a resource block corresponds to one slot (0.5 ms) in the time domain and twelve contiguous subcarriers in the frequency domain. Resource blocks are numbered in the frequency domain, starting with 0 from one end of the system bandwidth.

For error control, LTE uses hybrid-ARQ (HARQ), where, after receiving downlink data in a subframe, the mobile terminal attempts to decode it and reports to the base station whether the decoding was successful (ACK) or not (NACK) via a Physical Uplink Control Channel (PUCCH). In the event of an unsuccessful decoding attempt, the base station (evolved NodeB, or eNodeB, in 3GPP terminology) can retransmit the erroneous data. Similarly, the base station can indicate to the UE whether the decoding of the PUSCH was successful (ACK) or not (NACK) via the Physical Hybrid ARQ Indicator CHannel (PHICH).

In addition to the hybrid-ARQ ACK/NACK information transmitted from the mobile terminal to the base station, uplink control signaling from the mobile terminal to the base station also includes reports related to the downlink channel conditions, referred to generally as channel-state information (CSI) or channel-quality information (CQI). This CSI/CQI is used by the base station to assist in downlink resource scheduling decisions. Because LTE systems rely on dynamic scheduling of both downlink and uplink resources, uplink control-channel information also includes scheduling requests, which the mobile terminal sends to indicate that it needs uplink traffic-channel resources for uplink data transmissions.

When a UE has data to transmit on PUSCH, it multiplexes the uplink control information with data on PUSCH. Thus, a UE only uses PUCCH for signaling this uplink control information when it does not have any data to transmit on PUSCH. Accordingly, if the mobile terminal has not been assigned an uplink resource for data transmission, Layer 1/Layer 2 (L1/L2) control information, including channel-status reports, hybrid-ARQ acknowledgments, and scheduling requests, is transmitted in uplink resources (resource blocks) specifically assigned for uplink L1/L2 control on the Physical Uplink Control CHannel (PUCCH), which was first defined in Release 8 of the 3GPP specifications (LTE Rel-8).

Figure 4:
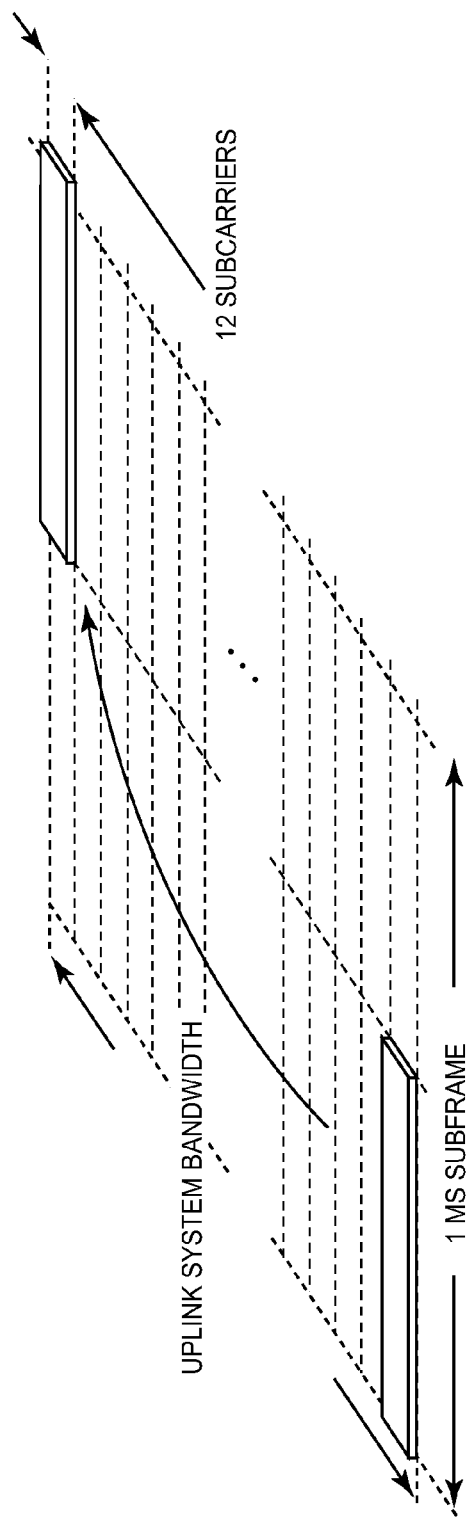
FIG. 4 illustrates the positioning of PUCCH resources in an uplink subframe according to Release 8 standards for LTE.

As illustrated in FIG. 4, these resources are located at the edges of the uplink cell bandwidth that is available to the mobile terminal for use. Each physical control channel resource is made up of a pair of resource blocks, where each resource block in turn consists of twelve OFDM subcarriers, within one of the two slots of the uplink subframe. In order to provide frequency diversity, the physical control channel resources are frequency hopped on the slot boundary—thus, the first resource block of the pair is at the lower part of the spectrum within the first slot of the subframe while the second resource block of the pair is positioned at the upper part of the spectrum during the second slot of the subframe (or vice-versa). If more resources are needed for the uplink L1/L2 control signaling, such as in case of very large overall transmission bandwidth supporting a large number of users, additional resource blocks can be assigned, adjacent to the previously assigned resource blocks.

The reasons for locating the PUCCH resources at the edges of the overall available spectrum are two-fold. First, together with the frequency hopping described above, this maximizes the frequency diversity experienced by the control signaling, which can be encoded so that it is spread across both resource blocks. Second, assigning uplink resources for the PUCCH at other positions within the spectrum, i.e., not at the edges, would fragment the uplink spectrum, making it difficult to assign very wide transmission bandwidths to a single mobile terminal while still retaining the single-carrier property of the uplink transmission.

When a UE has ACK/NACK to send in response to a downlink PDSCH transmission, it determines which PUCCH resource to use from the PDCCH transmission that assigned the PDSCH resources to the UE. More specifically, an index to the PUCCH resource for the UE is derived from the number of the first control channel element used to transmit the downlink resource assignment. When a UE has a scheduling request or CQI to send, it uses a specific PUCCH resource that has been pre-configured for the UE by higher layer signaling.

Depending on the different types of information that PUCCH is to carry, several different PUCCH formats may be used. The data-carrying capacity of a pair of resource blocks during one subframe is more than is generally needed for the short-term control signaling needs of one mobile terminal. Therefore, to efficiently exploit the resources set aside for control signaling, multiple mobile terminals can share the same physical control channel resource. This is done by assigning each of several mobile terminals different orthogonal phase-rotations of a cell-specific, length-12, frequency-domain sequence and/or different orthogonal time-domain cover codes. By applying these frequency-domain rotations and/or time-domain covering codes to the encoded control channel data, as many as 36 mobile terminals can share a given physical control channel resource in some circumstances.

Several different encoding formats have been developed by 3GPP to encode different quantities and types of uplink control channel data, within the constraints of a single physical control channel resource. These several formats, known generally as PUCCH Format 1, PUCCH Format 2, and PUCCH Format 3, are described in detail at pages 226-242 of the text "4G LTE/LTE-Advanced for Mobile Broadband," by Erik Dahlman, Stefan Parkvall, and Johan Sköld (Academic Press, Oxford UK, 2011), and are summarized briefly below.

PUCCH formats 1, 1a, and 1b, which are used to transmit scheduling requests and/or ACK/NACK, are based on cyclic shifts of a Zadoff-Chu sequence. A modulated data symbol is multiplied with the cyclically Zadoff-Chu shifted sequence. The cyclic shift varies from one symbol to another and from one slot to the next. Although twelve different shifts are available, higher-layer signaling may configure UEs in a given cell to use fewer than all of the shifts, to maintain orthogonality between PUCCH transmissions in cells that exhibit high frequency selectivity. After the modulated data symbol is multiplied with the Zadoff-Chu sequence, the result is spread using an orthogonal spreading sequence. PUCCH formats 1, 1a, and 1b carry three reference symbols per slot (when normal cyclic prefix is used), at SC-FDMA symbol numbers 2, 3, and 4.

PUCCH Formats 1a and 1b refer to PUCCH transmissions that carry either one or two hybrid-ARQ acknowledgements, respectively. A PUCCH Format 1 transmission (carrying only a SR) is transmitted on a UE-specific physical control channel resource (defined by a particular time-frequency resource, a cyclic-shift, and an orthogonal spreading code) that has been pre-configured by RRC signaling. Likewise, PUCCH Format 1a or 1b transmissions carrying only hybrid-ARQ acknowledgements are transmitted on a different UE-specific physical control channel resource. PUCCH Format 1a or 1b transmissions that are intended to carry both ACK/NACK information and a scheduling request are transmitted on the assigned SR resource for positive SR transmission, and are encoded with the ACK/NACK information.

Figure 5:
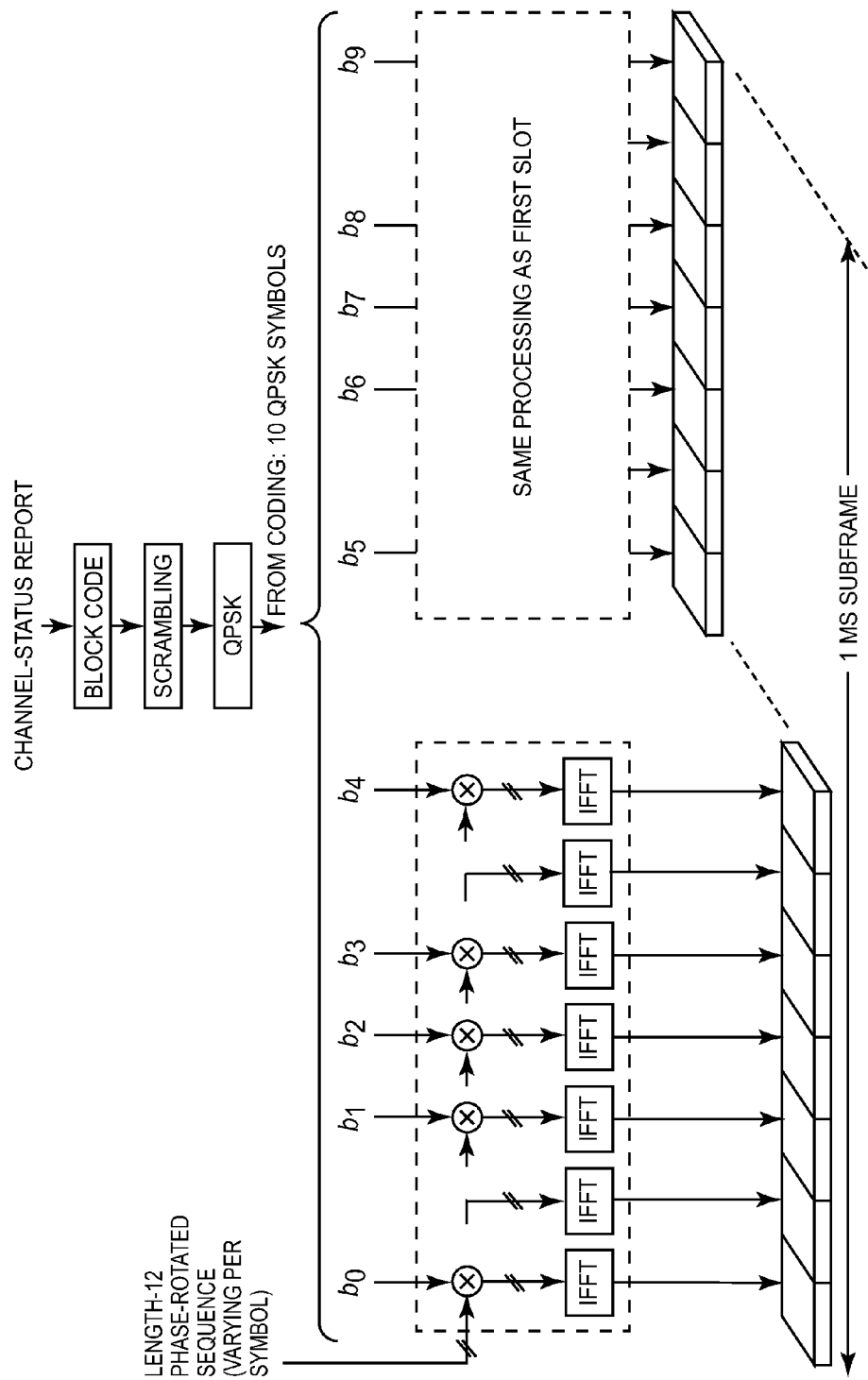
FIG. 5 illustrates the encoding and modulation of channel-status information according to PUCCH Format 2.

PUCCH Format 1/a/1b transmissions carry only one or two bits of information (plus scheduling requests, depending on the physical control channel resource used for the transmission). Because channel-state information reports require more than two bits of data per subframe, PUCCH Format 2/2a/2b is used for these transmissions. As illustrated in FIG. 5, in PUCCH formats 2, 2a, and 2b, the channel-status reports are first block-coded, and then the block-coded bits for transmission are scrambled and QPSK modulated. (FIG. 5 illustrates coding for a subframe using a normal cyclic prefix, with seven symbols per slot. Slots using extended cyclic prefix have only one reference-signal symbol per slot, instead of two.) The resulting ten QPSK symbols are then multiplied with a cyclically shifted Zadoff-Chu type sequence, a length-12 phase-rotated sequence, where again the cyclic shift varies between symbols and slots. Five of the symbols are processed and transmitted in the first slot, i.e., the slot appearing on the left-hand side of FIG. 5, while the remaining five symbols are transmitted in the second slot. PUCCH formats 2, 2a, and 2b carry two reference symbols per slot, located on SC-FDMA symbol numbers 1 and 5.

For UEs operating in accordance with LTE Release 8 or LTE Release 9 (i.e., without carrier aggregation), it is possible to configure the UE in a mode where it reports ACK/NACK bits and CSI bits simultaneously. If the UE is using normal cyclic prefix, one or two ACK/NACK bits are modulated onto a QPSK symbol on the second reference signal (RS) resource element in each slot of the PUCCH format 2. If one ACK/NACK bit is modulated on the second RS in each slot, the PUCCH format used by the UE is referred to as PUCCH Format 2a. If two ACK/NACK bits are modulated on the second RS in each slot the PUCCH format used by the UE is referred to as PUCCH Format 2b. If the UE is configured with extended cyclic prefix, one or two ACK/NACK bits are jointly coded with channel-state information (CSI) feedback and transmitted together within PUCCH format 2.

As with PUCCH Format 1 transmissions, a pair of resource blocks allocated to PUCCH can carry multiple PUCCH Format 2 transmissions from several UEs, with the separate transmissions separated by the cyclic shifting. As with PUCCH Format 1, each unique PUCCH Format 2 resource can be represented by an index from which the phase rotation and other quantities necessary are derived. The PUCCH format 2 resources are semi-statically configured. It should be noted that a pair of resource blocks can either be configured to support a mix of PUCCH formats 2/2a/2b and 1/1a/1b, or to support formats 2/2a/2b exclusively.

3GPP's Release 10 of the LTE standards (LTE Release 10) has been published and provides support for bandwidths larger than 20 MHz, through the use of carrier aggregation. One important requirement placed on the development of LTE Release 10 specifications was to assure backwards compatibility with LTE Release 8. The need for spectrum compatibility dictated that an LTE Release 10 carrier that is wider than 20 MHz should appear as a number of distinct, smaller bandwidth, LTE carriers to an LTE Release 8 mobile terminal. Each of these distinct carriers can be referred to as a component carrier.

For early LTE Release 10 system deployments in particular, it can be expected that there will be a relatively small number of LTE Release 10-capable mobile terminals, compared to many "legacy" mobile terminals that conform to earlier releases of the LTE specifications. Therefore, it is necessary to ensure the efficient use of wide carriers for legacy mobile terminals as well as Release 10 mobile terminals, i.e., that it is possible to implement carriers where legacy mobile terminals can be scheduled in all parts of the wideband LTE Release 10 carrier.

Figure 6:
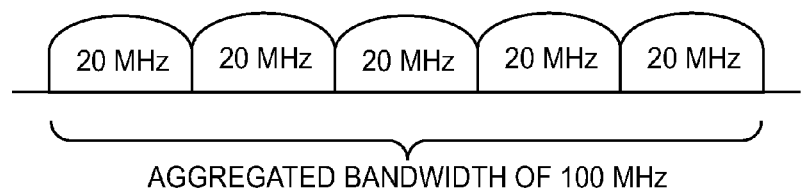
FIG. 6 illustrates several carriers aggregated to form an aggregated bandwidth of 100 MHz.

One straightforward way to obtain this is by means of a technique called carrier aggregation. With carrier aggregation, an LTE Release 10 mobile terminal can receive multiple component carriers, where each component carrier has (or at least may have) the same structure as a Release 8 carrier. The basic concept of carrier aggregation is illustrated in FIG. 6, which illustrates the aggregation of five 20-MHz component carriers to yield an aggregated bandwidth of 100 MHz.

The number of aggregated component carriers as well as the bandwidth for each individual component carrier may be different for uplink and downlink. In a symmetric configuration, the number of component carriers in downlink and uplink is the same, whereas the numbers of uplink and downlink carriers differ in an asymmetric configuration.

During initial access, an LTE Release 10 mobile terminal behaves similarly to an LTE Release 8 mobile terminal, requesting and obtaining access to a single carrier for the uplink and downlink. Upon successful connection to the network a mobile terminal may—depending on its own capabilities and the network—be configured with additional component carriers in the uplink (UL) and downlink (DL).

Even if a mobile terminal is configured with additional component carriers, it need not necessarily monitor all of them, all of the time. This is because LTE Release 10 supports activation of component carriers, as distinct from configuration. The mobile terminal monitors for PDCCH and PDSCH only component carriers that are both configured and activated. Since activation is based on Medium Access Control (MAC) control elements—which are faster than RRC signaling—the activation/de-activation process can dynamically follow the number of component carriers that is required to fulfill the current data rate needs. All but one component carrier—the downlink Primary component carrier (DL PCC)—can be deactivated at any given time.

Scheduling of a component carrier is done using the PDCCH or ePDCCH (extended PDCCH), via downlink assignments. Control information on the PDCCH or ePDCCH is formatted as a Downlink Control Information (DCI) message. In Release 8, where a mobile terminal only operates with one downlink and one uplink component carrier, the association between downlink assignment, uplink grants, and the corresponding downlink and uplink component carriers is very clear. In Release 10, however, two modes of carrier aggregation need to be distinguished. The first mode is very similar to the operation of multiple Release 8 mobile terminals, in that a downlink assignment or uplink grant contained in a DCI message transmitted on a component carrier applies either to the downlink component carrier itself or to a uniquely associated uplink component carrier. (This association may be either via cell-specific or UE-specific linking.) A second mode of operation augments a DCI message with a Carrier Indicator Field (CIF). A DCI containing a downlink assignment with CIF applies to the specific downlink component carrier indicated by the CIF, while a DCI containing an uplink grant with CIF applies to the indicated uplink component carrier.

DCI messages for downlink assignments contain, among other things, resource block assignment, modulation and coding scheme related parameters, and HARQ redundancy version indicators. In addition to those parameters that relate to the actual downlink transmission, most DCI formats for downlink assignments also contain a bit field for Transmit Power Control (TPC) commands. These TPC commands are used to control the uplink power control behavior of the corresponding PUCCH that is used to transmit the HARQ feedback.

Transmission of PUCCH in a carrier aggregation scenario (called "CA PUCCH" hereinafter) creates several issues. In particular, multiple hybrid-ARQ acknowledgement bits need to be fed back in the event of simultaneous transmission on multiple component carriers. Furthermore, from the perspective of the UE, both symmetric and asymmetric uplink/downlink component carrier configurations are supported. For some configurations, one may consider the possibility to transmit uplink control information on multiple PUCCH, or on multiple uplink component carriers. However, this option is likely to result in higher UE power consumption and a dependency on specific UE capabilities. It may also create implementation issues due to inter-modulation products, and would lead to generally higher complexity for implementation and testing.

Therefore, the transmission of PUCCH should have limited dependency on the uplink/downlink component carrier configuration. Thus, all uplink control information for a UE is transmitted on a single uplink component carrier, according to the 3GPP Release 10 specifications. A semi-statically configured and UE-specific uplink primary component carrier, which is frequently referred to as the "anchor carrier," is exclusively used for PUCCH.

UEs operating in accordance with LTE Release 8 or LTE Releast 9 (i.e., without carrier aggregation) are configured with only a single downlink component carrier and uplink component carrier. The time-frequency resource location of the first Control Channel Element (CCE) used to transmit PDCCH for a particular downlink assignment determines the dynamic ACK/NACK resource for Release 8 PUCCH. No PUCCH collisions can occur, since all PDCCH for a given subframe are transmitted using a different first CCE.

In a cell-asymmetric carrier aggregation scenario (or perhaps also for other reasons), multiple downlink component carriers may be cell-specifically linked to the same uplink component carrier. Mobile terminals configured with the same uplink component carrier but with different downlink component carriers (with any of the downlink component carrier that are cell-specifically linked with the uplink component carrier) share the same uplink PCC but may have different aggregations of secondary component carriers, in either the uplink or downlink. In this case, mobile terminals receiving their downlink assignments from different downlink component carriers will transmit their HARQ feedback on the same uplink component carrier. It is up to the scheduling process at the base station (in LTE, the evolved Node B, or eNB) to ensure that no PUCCH collisions occur.

When a mobile terminal is configured with multiple downlink component carriers it makes sense to use the Release 8 approach when possible. Each PDCCH transmitted on the downlink primary component carrier has, according to Release 8 specifications, a PUCCH resource reserved on the uplink primary component carrier. Thus, when a mobile terminal is configured with multiple downlink component carriers but receives a downlink assignment for only the downlink primary component carrier, it should still use the PUCCH resource on the uplink primary component carrier as specified in Release 8.

An alternative would be to specify the use of a "carrier aggregation PUCCH," or "CA PUCCH," which enables feedback of HARQ bits corresponding to the number of configured component carriers, for use whenever the mobile terminal is configured with multiple downlink carriers, regardless of whether a particular assignment is only for the downlink primary component carrier. Since configuration is a rather slow process and a mobile terminal may be configured with multiple component carriers often—even though only the downlink primary component carrier is active and used—this would lead to a very inefficient usage of carrier aggregation PUCCH resources.

Upon reception of downlink assignments on a single secondary component carrier or upon reception of multiple downlink assignments, a special carrier aggregation PUCCH should be used. While in the latter case it is obvious to use CA PUCCH—since only CA PUCCH supports feedback of HARQ bits of multiple component carriers—it is less clear that CA PUCCH should also be used in the first case. First, a downlink secondary component carrier assignment alone is not typical. The eNodeB scheduler should strive to schedule a single downlink component carrier assignment on the downlink primary component carrier and try to de-activate secondary component carriers if only a single downlink carrier is needed. Another issue is that the PDCCH for a downlink secondary component carrier assignment is transmitted on the secondary component carrier (assuming CIF is not configured) and, hence there is no automatically reserved Rel-8 PUCCH resource on the uplink primary component carrier. Using the Rel-8 PUCCH even for stand-alone downlink secondary component carrier assignments would require reserving Rel-8 resources on the uplink primary component carrier for any downlink component carrier that is configured for any mobile terminal that uses this uplink primary component carrier. Since stand-alone secondary component carrier assignments are atypical, this would lead to an unnecessary over-provisioning of Rel-8 PUCCH resources on uplink primary component carrier.

It should be noted that a possible error case that may occur with CA PUCCH arises when the eNodeB schedules a mobile terminal on multiple downlink component carriers, including the primary component carrier. If the mobile terminal misses all but the downlink primary component carrier assignment, it will use Rel-8 PUCCH instead of CA PUCCH. To detect this error case the eNodeB has to monitor both the Rel-8 PUCCH and the CA PUCCH in the event that assignments for multiple downlink component carriers have been sent.

The number of HARQ feedback bits that a mobile terminal has to provide depends on the number of downlink assignments actually received by the mobile terminal. In a first case, the mobile terminal could adopt a particular CA PUCCH format according to the number of received assignments and provide feedback accordingly. However, one or more PDCCHs carrying downlink assignments can get lost. Adopting a CA PUCCH format according to the number of received downlink assignments is therefore ambiguous, and would require the testing of many different hypotheses at the eNodeB.

Alternatively, the PUCCH format could be set by the carrier activation message. A working group in 3GPP has decided that activation and de-activation of component carriers is done with Medium Access Control (MAC) layer control element and that per-component-carrier activation and de-activation is supported. MAC signaling, and especially the HARQ feedback signaling indicating whether the activation command has been received successfully, is error prone. Furthermore, this approach requires testing of multiple hypotheses at the eNodeB.

Accordingly, basing the CA PUCCH format on the number of configured component carrier seems therefore the safest choice. Configuration of component carrier is based on Radio Resource Control (RRC) signaling. After successful reception and application of a new configuration, a confirmation message is sent back, making RRC signaling very safe.

As noted earlier, feedback of ARQ ACK/NACK information for two or more component carriers may require the transmission of more than two bits, which is the most that can be handled by PUCCH Format 1. Accordingly, PUCCH for carrier aggregation scenarios requires additional techniques or formats. Two approaches were specified in LTE Release 10 specifications. First, PUCCH Format 1 may be used in combination with a technique called resource selection or channel selection. However, this is not an efficient solution for more than four bits. Accordingly, another format, PUCCH Format 3, has been developed to enable the possibility of transmitting more than four ACK/NACK bits in an efficient way.

The first of these two approaches is often simply called channel selection. The basic principle behind this approach is that the UE is assigned a set of up to four different PUCCH format 1a/1b resources. The UE then selects one of the resources according to the ACK/NACK sequence the UE should transmit. Thus, the selection of a particular one of the resources serves to communicate up to two bits of information. On one of the assigned resources the UE then transmits a QPSK or BPSK symbol value, encoding the remaining one or two bits of information. The eNodeB detects which resource the UE uses as well as the QPSK or BPSK value transmitted on the used resource and combines this information to decode a HARQ response for downlink cells associated with the transmitting UE.

Figure 7:
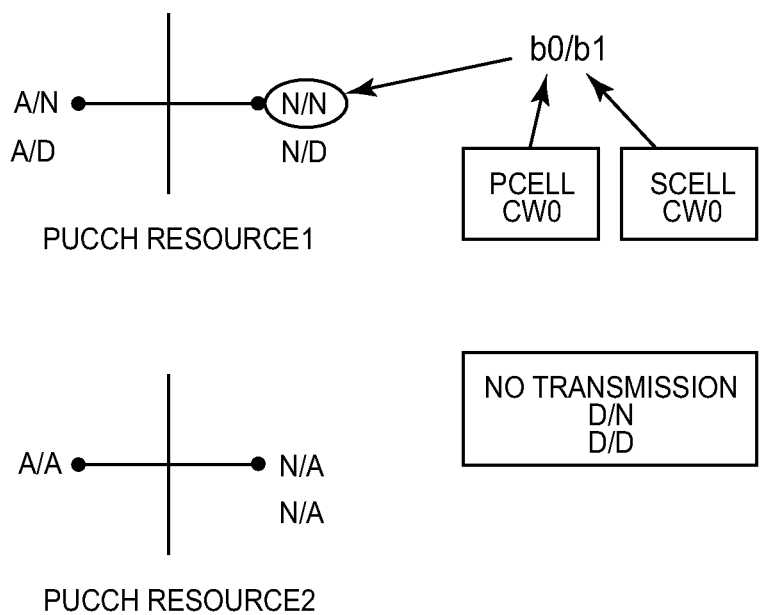
FIGS. 7, 8, and 9 illustrate the coding of multiple ACK/NACK bits using channel selection.
Figure 8:
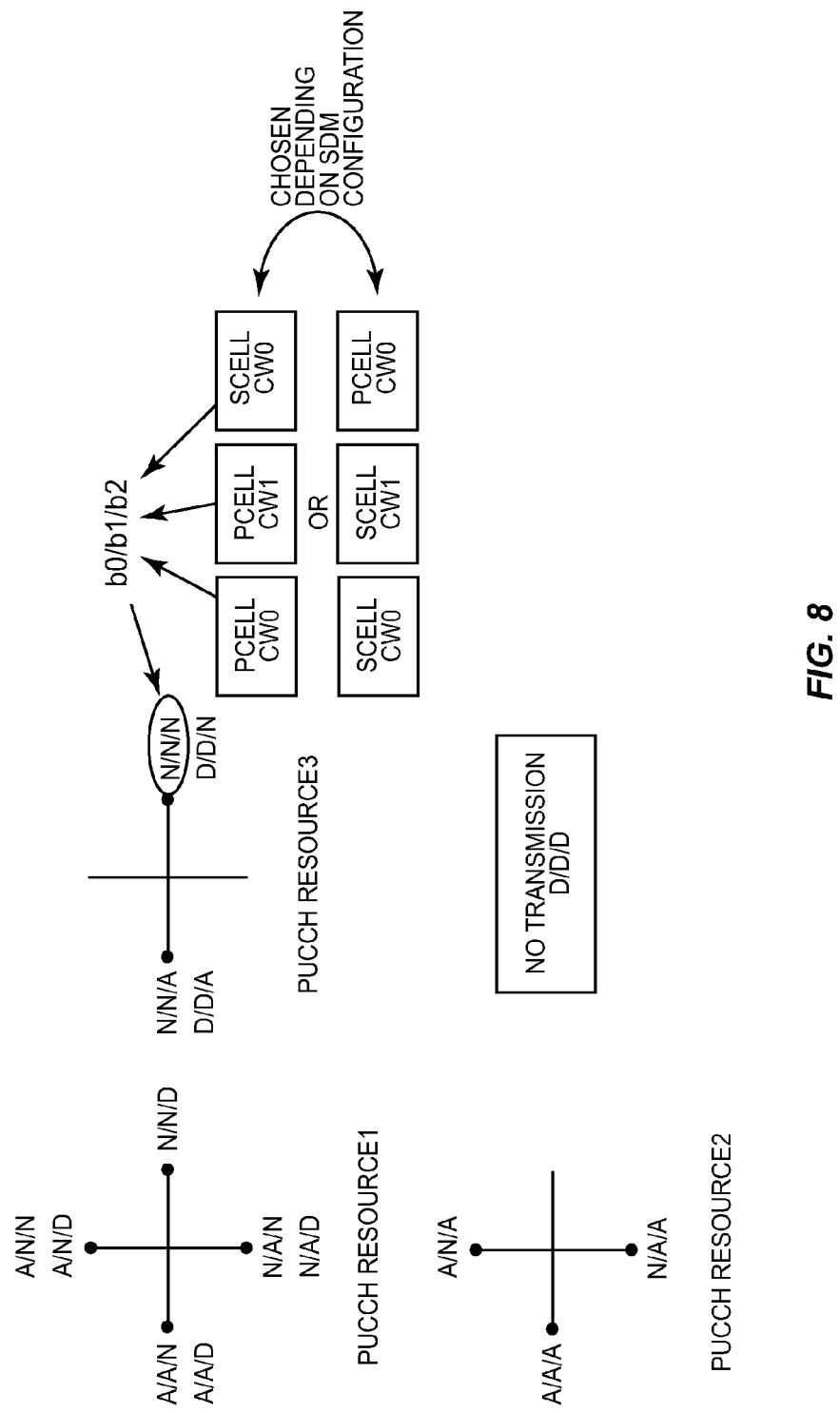
Figure 9:
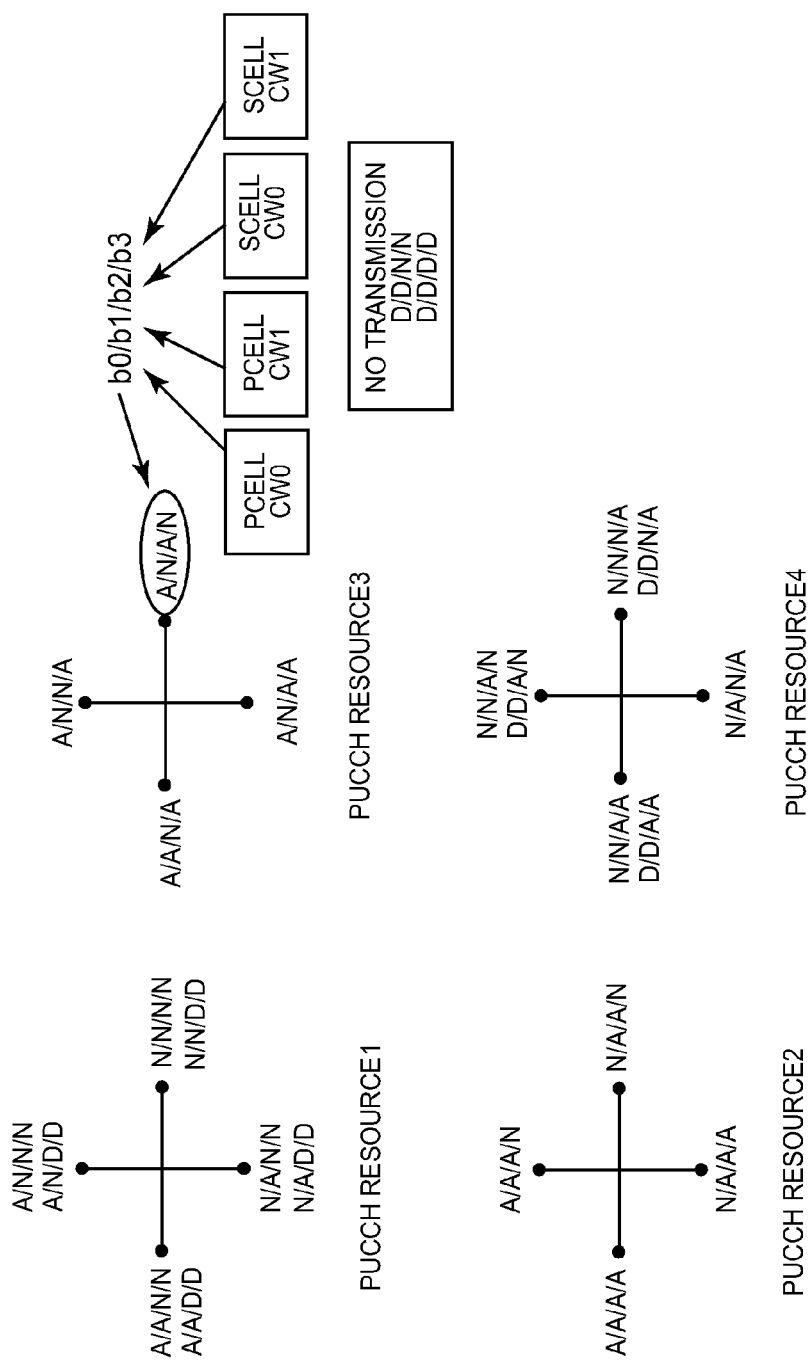

The use of channel selection to code ACK (A), NACK (N) and DTX (D) for multiple component carriers is shown in FIG. 7, FIG. 8, and FIG. 9, which apply to LTE FDD systems. A similar type of mapping, but including a bundling approach, is done for TDD in the event that the UE is configured with channel selection.

In FIG. 7, two ACK/NACK messages are transmitted and two PUCCH resources are configured. In each resource, a BPSK modulated symbol can be transmitted, as shown in the figure, hence in total one out of four different signals can be transmitted. If PUCCH resource 1 is selected, then one of the BPSK constellation points indicates an ACK for primary cell codeword 0 (indicated as PCell CW0 in the figures) and a NACK for secondary cell codeword 0 (Scell CW0), or ACK and DTX respectively. This is shown as A/N and A/D in FIG. 7. The other constellation point in this PUCCH resource 1 indicates NACK and NACK (or NACK and DTX) for the primary cell and secondary cell respectively. Thus, a BPSK symbol transmitted in PUCCH resource 1 indicates either ACK/NACK or ACK/DTX for the primary cell and secondary cell, respectively, for a first value of the BPSK symbol, and NACK/NACK or NACK/DTX for the primary cell and secondary cell, respectively, for the other value of the BPSK symbol. If PUCCH resource 2 is selected for transmission, on the other hand, then the first value of the BPSK symbol indicate A/A (ACK/ACK) for the primary and secondary cells, respectively, while the second value indicates N/A (NACK/ACK) or D/A (DTX/ACK) for the primary and secondary cells.

For example, if the mobile terminal wants to report an ACK for the primary and a NACK for the secondary cell, then PUCCH resource 1 is selected and the BPSK constellation point corresponding to A/N is transmitted. Note that since this constellation point also indicates A/D, there is no difference from the eNB perspective whether the mobile terminal reports a NACK or DTX for the transmission on the secondary cell. In FIGS. 8 and 9, this principle is extended to 3 and 4 ACK/NACK bits, respectively. Thus, three PUCCH resources are configured to send 3 ACK/NACK bits, as shown in FIG. 8, while four PUCCH resources are configured to send 4 ACK/NACK bits, as shown in FIG. 9. QPSK modulation is used in both cases; thus a symbol transmitted in a given one of the 3 or four PUCCH resources can indicate one of up to four different combinations of ACK/NACK bits.

Figure 10:
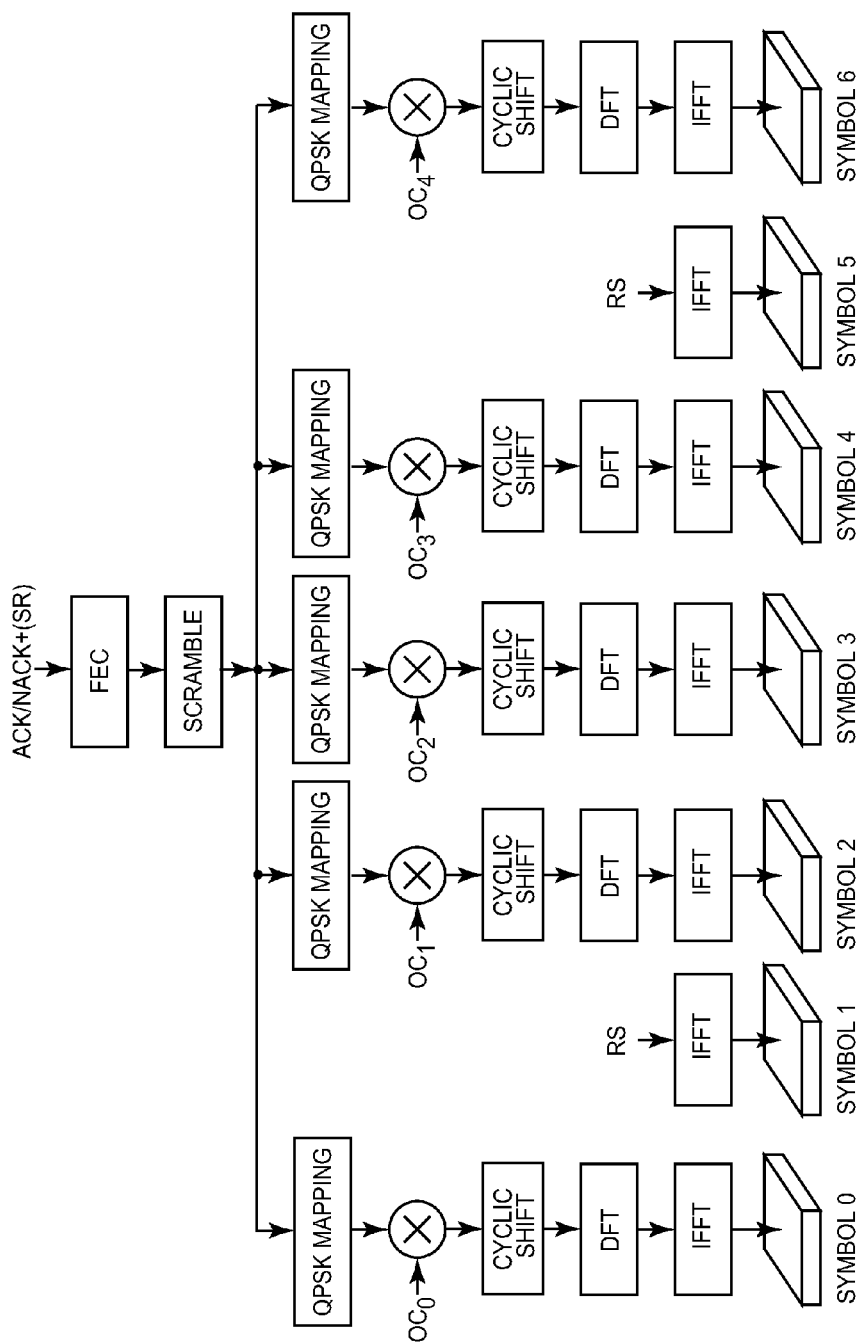
FIG. 10 illustrates the encoding and modulation of multiple ACK/NACK bits according to PUCCH Format 3.

A second approach, which is more efficient when more than four bits of information need to be transmitted, is called PUCCH Format 3 and is based on Discrete Fourier Transform (DFT)-spread OFDM. FIG. 10 shows a block diagram of that design, for a single slot. The same processing is applied to the second slot of the uplink frame. The multiple ACK/NACK bits are encoded, using a forward-error correction (FEC) code, to form 48 coded bits. The coded bits are then scrambled, using cell-specific (and possibly DFT-spread OFDM symbol dependent) sequences. 24 bits are transmitted within the first slot and the other 24 bits are transmitted within the second slot. The 24 bits per slot are then mapped into 12 QPSK symbols, as indicated by the blocks labeled "QPSK mapping" in FIG. 10, which appear in five of the OFDM symbols of the slot (symbols 0, 2, 3, 4, and 6). The sequence of symbols in each of these five symbols in the slot is spread with OFDM-symbol-specific orthogonal cover codes, indicated by OC0, OC1, OC2, OC3, and OC4 in FIG. 10, and cyclically shifted, prior to DFT-precoding. The DFT-precoded symbols are converted to OFDM symbols (using an Inverse Fast-Fourier Transform, or IFFT) and transmitted within one resource block (the bandwidth resource) and five DFT-spread OFDM symbols (the time resource). The spreading sequence or orthogonal cover code (OC) is UE-specific and enables multiplexing of up to five users within the same resource blocks.

For the reference signals (RS), cyclic-shifted constant-amplitude zero-autocorrelation (CAZAC) sequences can be used. For example, the computer optimized sequences in 3GPP TS 36.211, "Physical Channels and Modulation," can be used.

Even with the several PUCCH formats already standardized by 3GPP, problems remain. According to the Release 8 specifications for LTE, a mobile terminal (a "UE" in 3GPP terminology) can be configured to either simultaneously transmit periodic CSI and ACK/NACK on PUCCH using Format 2a/2b, or to drop periodic CSI and only transmit ACK/NACK on PUCCH in case of collisions. In Release 10, however, simultaneous transmission of periodic CSI information and ACK/NACK bits for multiple cells is only possible if simultaneous transmission of PUSCH and PUCCH is configured. Thus, in the event of a collision between multi-cell ACK/NACK and periodic CSI the latter is dropped and only the multi-cell ACK/NACK is transmitted.

Periodic CSI reports for multiple cells are handled in Release 10 with time-shifted reporting times, to minimize collisions among CSI reports. To maintain roughly the same CSI periodicity per cell, it is obvious that periodic CSI reports are transmitted more frequently than in single cell systems. In each subframe without PUSCH transmission where periodic CSI and multi-cell ACK/NACK collide, the periodic CSI are dropped. Since CSI reports are required for link adaptation, reduced CSI feedback degrades downlink performance. This is in particular a problem for TDD, where only a minority of the available subframes may be uplink subframes.

In several embodiments of the present invention, these problems are addressed by introducing a new uplink control channel capability that enables a mobile terminal to simultaneously report to the radio network multiple packet receipt status bits, (e.g., ACK/NACK bits) and channel-condition bits (e.g., CSI reports). In particular, a new PUCCH design is described herein, to enable simultaneous transmission of multi-cell ACK/NACK (multi-cell includes ACK/NACK from a single secondary component carrier as well) and CSI reports. The transmission scheme is designed so that a mobile terminal can use the PUCCH Format 3 resources for "normal" PUCCH format 3 transmissions as well as to carry ACK/NACK and CSI bits that are handled according to the detailed techniques described in the disclosure. This is done to reduce additional resource signaling—thus, a mobile terminal already configured with PUCCH Format 3 resources can reuse these resources.

In the discussion that follows, specific details of particular embodiments of the present invention are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not obscure the description with unnecessary detail. Those skilled in the art will appreciate that the functions described may be implemented in one or in several nodes. Some or all of the functions described may be implemented using hardware circuitry, such as analog and/or discrete logic gates interconnected to perform a specialized function, ASICs, PLAs, etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Figure 11:
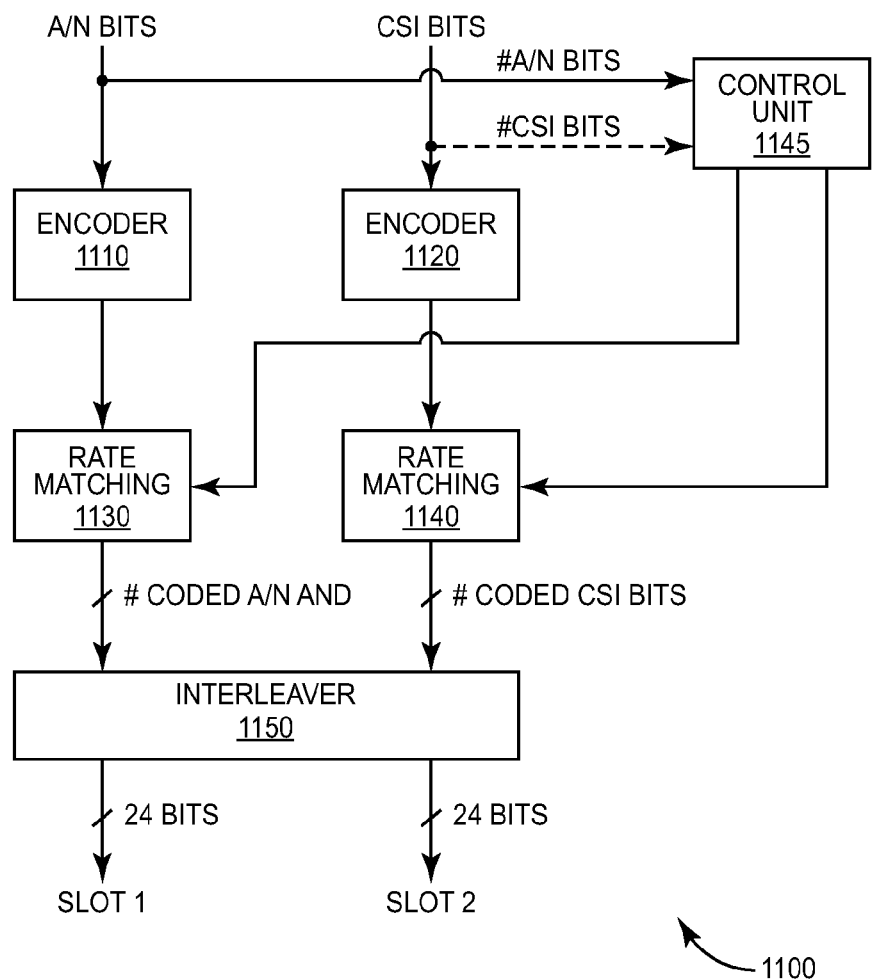
FIG. 11 is a block diagram illustrating details of an example encoding circuit according to some embodiments of the invention.

FIG. 11 shows a block diagram of an encoding circuit 1100, configured to generate the new PUCCH format. Separate encoders 1110 and 1120 are used to encode ACK/NACK and CSI bits, respectively. This is done to enable the application of different degrees of error protection to the two groups of bits, since ACK/NACK and CSI typically have different requirements with respect to error rate. In some embodiments the encoders are Reed Muller (RM) coders, but other codes could be used. Furthermore, different code types for ACK/NACK and CSI may be used, in some embodiments. In these or in some other embodiments, different code types may be used to encode ACK/NACK, depending on the number of ACK/NACK bits to be encoded. For example, in some embodiments, n ACK/NACK bits are encoded using Reed Muller code, while m ACK/NACK bits are encoded using a convolutional code. For CSI bits, a similar behavior is possible.

In the discussion that follows, the number of total coded bits (i.e., ACK/NACK coded bits plus CSI coded bits) is denoted N. In many embodiments, N is 48, since this is the total number of coded bits that can be transmitted using the transmission scheme that is described in detail below. However, it will be appreciated that encoder circuit 1100 can be modified to accommodate a different number of coded bits.

In several embodiments of these techniques, the number of coded bits that are allocated to encoded ACK/NACK information depends on the number of ACK/NACK bits. If ACK/NACK bundling is applied, the number of ACK/NACK bits after bundling is important. Alternatively, the number of coded ACK/NACK bits can be determined by both the number of ACK/NACK bits and the number of CSI bits. In some embodiments, the coding of ACK/NACK bits to achieve a particular bit-error is prioritized. In these embodiments, the number of bits allocated to coded ACK/NACK bits is determined so that the ACK/NACK transmission fulfills its desired bit-error rate, while the number of coded bits allocated to CSI is simply the number of remaining coded bits. If the number of coded CSI bits is too few to support transmission of complete CSI information with desired performance, a prioritization of CSI information can be performed, so that only the most important CSI bits are encoded and transmitted.

Rate matchers 1130 and 1140 adapt the ACK/NACK and CSI code blocks to fit into their allocated bit sizes, under the control of control unit 1145. Rate matching can be done by puncturing or cyclic rate matching, for example.

The two slots carrying the encoded data are transmitted in different frequency bands, providing frequency diversity. To obtain full diversity it is advantageous for ACK/NACK information and CSI information to each be spread across both slots. Thus, each slot should carry some of the encoded ACK/NACK bits and some of the CSI bits. This is taken care of by the interleaver 1150. Any of several different kinds of interleaver designs can be used. For instance, one common interleaver 1150 that handles both ACK/NACK bits and CSI bits is shown in FIG. 11. No differentiation is made between these two bit types with this interleaver. Another approach uses separate interleavers for ACK/NACK bits and CSI bits, respectively. With this approach, an additional mapping step or additional interleaver is needed to ensure that each bit type is transmitted in both slots.

In addition to the above design considerations, interleaver 1150 can also be designed to avoid mixing coded bit types within modulation symbols, so that each modulation symbol either carries ACK/NACK bits or CSI bits, but not both. One benefit of this approach is that power control can then be applied to the ACK/NACK bits independently of power control applied to the CSI bits. Thus, this is a possible design constraint but not a must.

The transmission of the encoded bits is split among at least two slots. Thus, the first NIL bits are now transmitted in the first slot, in the second slot the next NIL bits, and so on, where L is the number of slots into which the N bits are divided. In some embodiments, L is 2, so that the first N/2 bits are transmitted in the first slot and the second N/2 bits are transmitted in the second slot.

Figure 12:
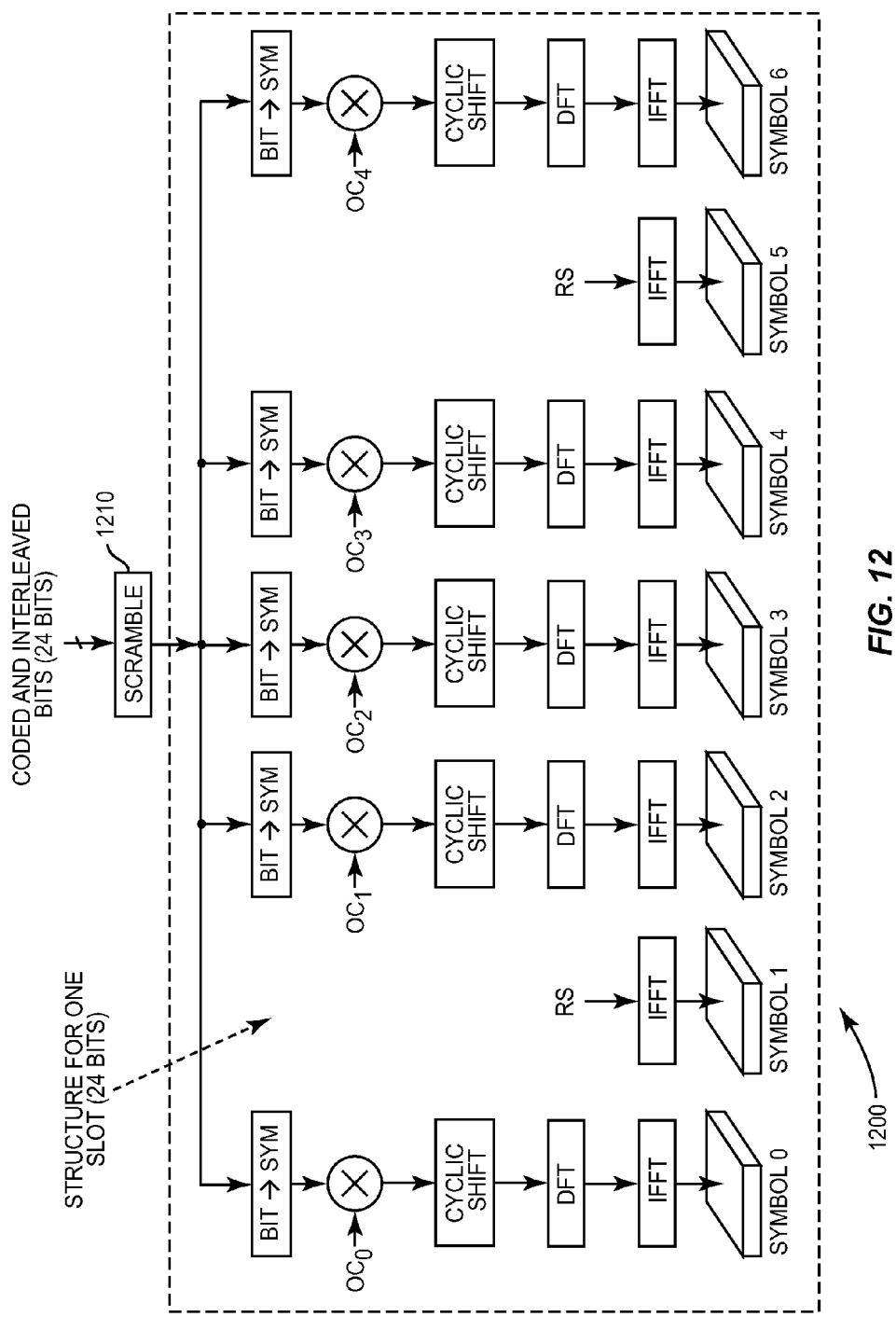
FIG. 12 illustrates the scrambling and modulation of multiple ACK/NACK bits and channel-state information according to some embodiments of the invention.

In some embodiments, the remaining transmission structure per slot is similar to PUCCH format 3. An example implementation is shown in FIG. 12, which illustrates the details of a modulation circuit 1200. This figure only shows one slot, i.e., a similar transmission is performed in one or more other slots with the remaining interleaved bits as input. Assuming this structure is used with each of two slots, as with LTE PUCCH Format 3, the total number of coded bits N is equal to 48 and the number of coded bits per slot N/2=24. It will be appreciated, however, that modulation circuit 1200 may be adapted to accommodate a different number of coded bits.

In the pictured circuit, scrambler 1210 operates on bits that have already been interleaved (e.g., with interleaver 1150 from FIG. 11). In some embodiments, however, scrambling may alternatively be applied prior to interleaving, in which case scrambler 1210 would be moved from FIG. 12 to FIG. 11 and inserted prior to the interleaver 1150.

A comparison of FIG. 12 with FIG. 10 reveals that the bit mapping and modulation unit 1220, in the lower part of the pictured modulation circuit, operates in a similar way to a unit configured to generate PUCCH Format 3. As a result, the scheme illustrated in FIGS. 11 and 12 also works with Space Orthogonal Resource Transmit Diversity (SORTD). To support Frequency-Switched Transmit Diversity (FSTD) as well, interleaver 1150 must make sure that each bit type (ACK/NACK bits and CSI bits) are transmitted across multiple slots and multiple transmit antennas.

The system illustrated in FIGS. 11 and 12 can also be adapted to accommodate the simultaneous transmission of a scheduling request with the encoded ACK/NACK and CSI bits. In some embodiments, the scheduling request bit is jointly encoded with ACK/NACK bits. In others, the scheduling request bit is jointly encoded with CSI bits, instead. In some embodiments, whether a scheduling request bit is transmitted may influence the distribution of the N coded bits to coded ACK/NACK bits and coded CSI bits.

Figure 13:
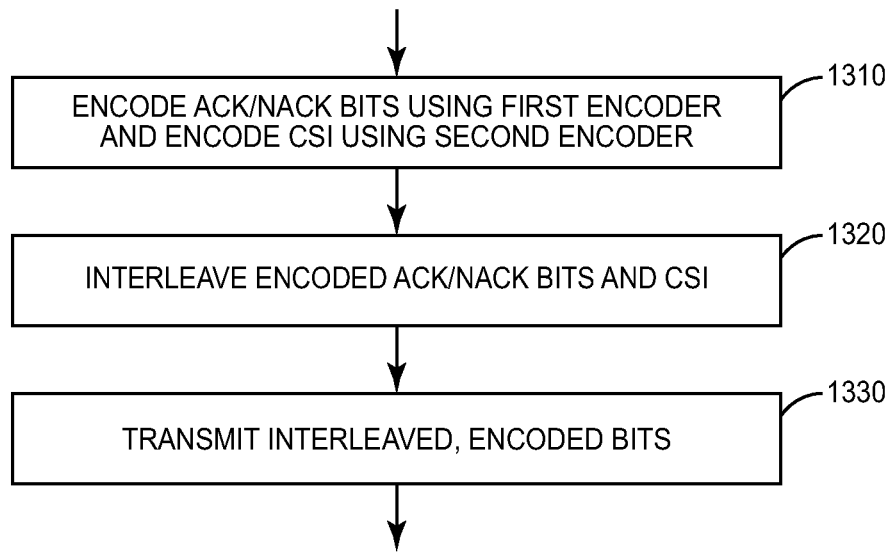
FIG. 13 is a process flow diagram illustrating an example method for simultaneous reporting of channel-state information bits and hybrid-ARQ ACK NACK bits for multiple downlink subframes or multiple downlink carriers, or both.

New techniques enabled by this new PUCCH design include methods, implemented in a mobile terminal, for signaling ACK/NACK data, CSI data, or both. FIG. 13 is a process flow diagram that illustrates, more generally, a method for simultaneous reporting of channel-state information and hybrid-ARQ ACK/NACK information for multiple downlink subframes or multiple downlink carriers, or both, suitable for implementation by a mobile terminal. Of course, the illustrated method should be understood within the context of mobile terminal processing in general, and in the context of forming and transmitting uplink control channel information, more particularly. The pictured method may be carried out as part of the processing carried out by a mobile terminal for each uplink subframe, for example.

As shown at block 1310, the method begins with encoding the hybrid-ARQ ACK/NACK bits using a first encoder and separately encoding the channel-state information bits using a second encoder. Next, as shown at block 1320, the encoded hybrid-ARQ ACK/NACK bits and the encoded channel-state information bits are interleaved. Finally, the interleaved, encoded bits are transmitted in physical control channel resources of a first uplink subframe, on a single carrier, as shown at block 1330.

As noted above, in some embodiments, the interleaved, encoded bits are transmitted in two slots of the first uplink subframe, the two slots having different subcarrier frequencies. In these embodiments, each slot carries a plurality of the encoded hybrid-ARQ ACK/NACK bits and a plurality of the encoded channel-state information bits. In some embodiments, the interleaved, encoded bits are grouped into multi-bit modulation symbols for transmission and the interleaver ensures that each of the multi-bit modulation symbols includes encoded hybrid-ARQ ACK/NACK bits or encoded channel-state information bits, but not both.

In some embodiments, the encoded hybrid-ARQ ACK/NACK bits and the encoded channel-state information bits are scrambled, prior to interleaving, using one or more scrambling sequences that are configured by RRC. In other embodiments, a scrambling operation is performed after the interleaving, prior to transmission, again using one or more configured scrambling sequences. In some embodiments, a scheduling request bit is jointly coded with the hybrid-ARQ ACK/NACK bits or the channel-state information bits.

The method illustrated in FIG. 13, and the variants suggested above, can be applied in an LTE context in such a manner that the encoded, interleaved bits are transmitted using a Physical Uplink Control Channel (PUCCH) Format 3 resource. Further, these techniques can be combined with other schemes and formats for transmitting different numbers and/or combinations of ACK/NACK bits and others. For example, simultaneous transmissions of channel-state information and ACK/NACK bits for only a single component carrier may be handled differently. So, for a second subframe for which both a transmission of second channel-state information and a transmission of one or two hybrid-ARQ ACK/NACK bits for only a downlink primary cell transmission are scheduled, the second channel-state information and the one or two hybrid-ARQ ACK/NACK bits for the downlink primary cell transmission can be transmitted using a pre-configured PUCCH format 2 resource in the second subframe. Alternatively, for a second subframe for which both a transmission of second channel-state information and a transmission of one or two hybrid-ARQ ACK/NACK bits for only a downlink primary cell transmission are scheduled, the second channel-state information may be dropped, and only the one or two hybrid-ARQ ACK/NACK bits for the downlink primary cell transmission are transmitted, using a PUCCH format 1 resource in the second uplink subframe.

The specific behavior of the mobile terminal in these scenarios may depend, in some embodiments, on RRC configuration of the mobile terminal. Thus, the method illustrated in FIG. 13 may be preceded by a step in which the mobile terminal first determines that it has been configured, via received signaling, for simultaneous transmission of hybrid-ARQ ACK/NACK bits and periodic channel-state information bits.

As noted earlier, the specific coding and formatting of the ACK/NACK bits and channel-state information bits may vary. In some embodiments, for example, encoding the hybrid-ARQ ACK/NACK bits using the first encoder comprises selecting a number of coded ACK/NACK bits for transmission as a function of a number of hybrid-ARQ ACK/NACK bits for the multiple downlink subframes or multiple downlink carriers, or both. The selected number of coded ACK/NACK bits may depend on a number of hybrid-ARQ ACK/NACK bits after ACK/NACK bundling, in scenarios where ACK/NACK bundling is used.

Encoding the hybrid-ARQ ACK/NACK bits using the first encoder may be followed by rate-matching of an initial set of coded ACK/NACK bits, to obtain a selected number of coded ACK/NACK bits, in some embodiments. This rate-matching may comprise, for example, puncturing of the initial set of coded ACK/NACK bits or cyclic rate-matching of the initial set of coded ACK/NACK bits to obtain the selected number of coded ACK/NACK bits.

In some embodiments, the handling of channel-state-information bits depends on decisions taken with respect to processing the ACK/NACK bits. Thus, for example, the number of encoded channel-state-information bits for transmission may be determined as a function of the selected number of coded ACK/NACK bits for transmission. In some cases, the channel-state information bits are prioritized, and only the highest priority channel-state information bits selected for encoding and transmitting.

Figure 14:
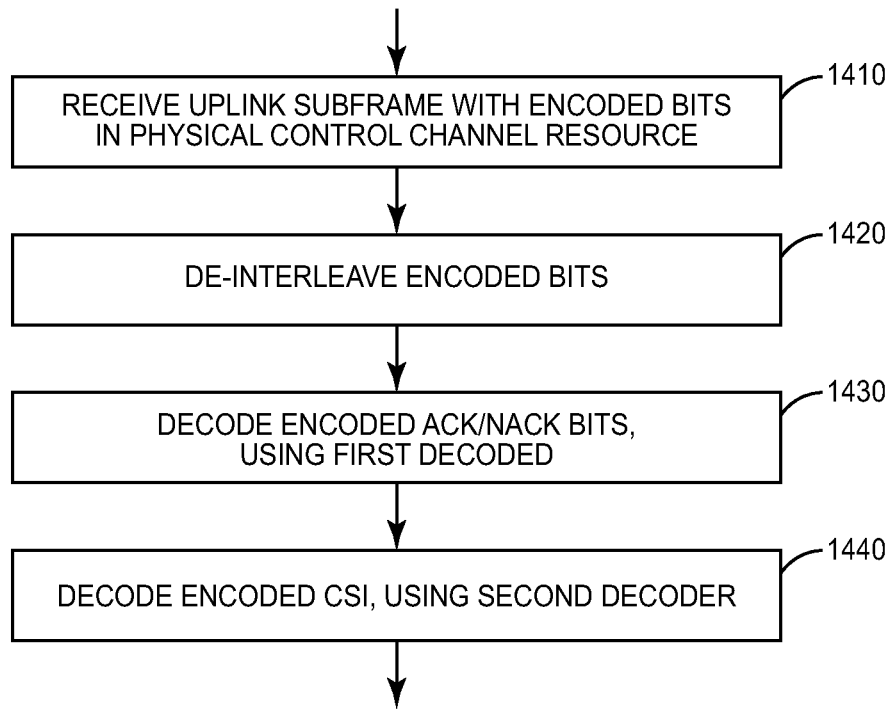
FIG. 14 is a process flow diagram illustrating an example method for receiving and decoding simultaneously reported channel-state information and hybrid-ARQ ACK/NACK bits.

FIG. 14 is a process flow diagram illustrating a corresponding technique for receiving and processing an uplink control channel that has been generated and transmitted according to the methods described above. The method illustrated in FIG. 14 might be implemented in a wireless base station, for example, such as an LTE eNodeB. For a given subframe, the method begins, as shown at block 1410, with the receiving of an uplink subframe that carries a plurality of encoded bits in a physical control channel resource. The plurality of encoded bits are then de-interleaved, to obtain encoded hybrid-ARQ ACK/NACK bits and encoded channel-state information bits, as shown at block 1420. As illustrated at block 1430, the encoded hybrid-ARQ ACK/NACK bits are decoded, using a first decoder, to obtain hybrid-ARQ ACK/NACK bits for multiple downlink subframes or multiple downlink carriers, or both, transmitted to the mobile terminal. As shown at block 1440, the encoded channel-state information bits are decoded separately, using a second decoder, to obtain the channel-state information bits for the mobile terminal. Of course, because the hybrid-ARQ ACK/NACK bits and the channel-state information bits are encoded and decoded separately, the decoding steps of 1430 and 1440 can be performed in any order.

In some embodiments, the encoded bits are received in two slots of the first uplink subframe, the two slots having different subcarrier frequencies, such that each slot comprises a plurality of the encoded hybrid-ARQ ACK/NACK bits and a plurality of the encoded channel-state information bits. In some embodiments, the encoded bits are grouped into multi-bit modulation symbols, each of the multi-bit modulation symbols including encoded hybrid-ARQ ACK/NACK bits or encoded channel-state information bits, but not both. Descrambling operations may be included, in some embodiments. In some, the encoded hybrid-ARQ ACK/NACK bits and the encoded channel-state information bits are descrambled prior to the illustrated decoding steps and after the de-interleaving operation, using one or more configured scrambling sequences. In others, the encoded bits are descrambled prior to the de-interleaving, using one or more configured scrambling sequences.

The functions in the block diagrams of FIGS. 11 and 12 and in the process flow diagram of FIG. 13 may be implemented using electronic data processing circuitry provided in the mobile terminal. Likewise, the functions in the flowchart of FIG. 14 may be implemented using electronic data processing circuitry provided in a base station. Each mobile terminal and base station, of course, also includes suitable radio circuitry for receiving and transmitting radio signals formatted in accordance with known formats and protocols, e.g., LTE formats and protocols.

Figure 15:
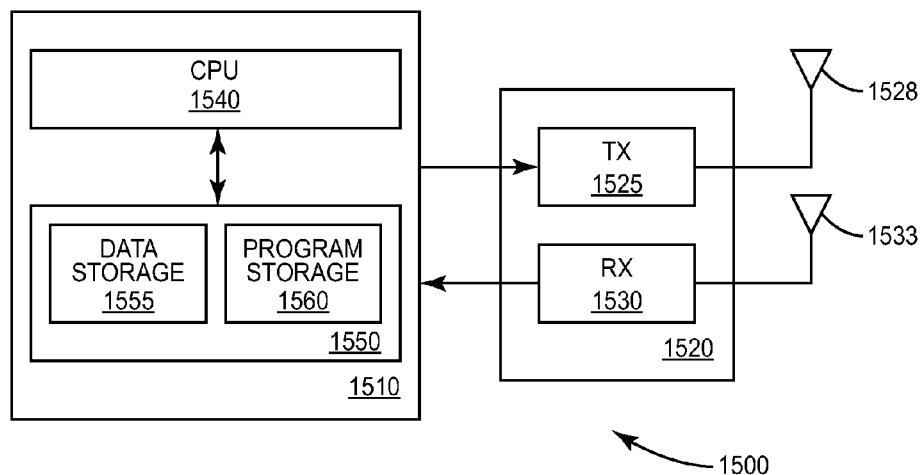
FIG. 15 is a block diagram illustrating components of an example communications node according to some embodiments of the invention.

FIG. 15 illustrates features of an example communications node 1500 according to several embodiments of the present invention. Although the detailed configuration, as well as features such as physical size, power requirements, etc., will vary, the general characteristics of the elements of communications node 1500 are common to both a wireless base station and a mobile terminal. Further, both may be adapted to carry out one or several of the techniques described above for encoding and transmitting ACK/NACK bits and channel-state information or decoding such information from a received signal.

Communications node 1500 comprises a transceiver 1520 for communicating with mobile terminals (in the case of a base station) or with one or more base stations (in the case of a mobile terminal) as well as a processing circuit 1510 for processing the signals transmitted and received by the transceiver 1520. Transceiver 1520 includes a transmitter 1525 coupled to one or more transmit antennas 1528 and receiver 1530 coupled to one or more receive antennas 1533. The same antenna(s) 1528 and 1533 may be used for both transmission and reception. Receiver 1530 and transmitter 1525 use known radio processing and signal processing components and techniques, typically according to a particular telecommunications standard such as the 3GPP standards for LTE and/or LTE-Advanced. Because the various details and engineering tradeoffs associated with the design and implementation of such circuitry are well known and are unnecessary to a full understanding of the invention, additional details are not shown here.

Processing circuit 1510 comprises one or more processors 1540, hardware, firmware or a combination thereof, coupled to one or more memory devices 1550 that make up a data storage memory 1555 and a program storage memory 1560. Memory 1550 may comprise one or several types of memory such as read-only memory (ROM), random-access memory, cache memory, flash memory devices, optical storage devices, etc. Again, because the various details and engineering tradeoffs associated with the design of baseband processing circuitry for mobile devices and wireless base stations are well known and are unnecessary to a full understanding of the invention, additional details are not shown here.

Typical functions of the processing circuit 1510 include modulation and coding of transmitted signals and the demodulation and decoding of received signals. In several embodiments of the present invention, processing circuit 1510 is adapted, using suitable program code stored in program storage memory 1560, for example, to carry out one of the techniques described above for encoding and transmitting ACK/NACK bits and channel-state information or decoding such information from a received signal. Of course, it will be appreciated that not all of the steps of these techniques are necessarily performed in a single microprocessor or even in a single module.

Figure 16:
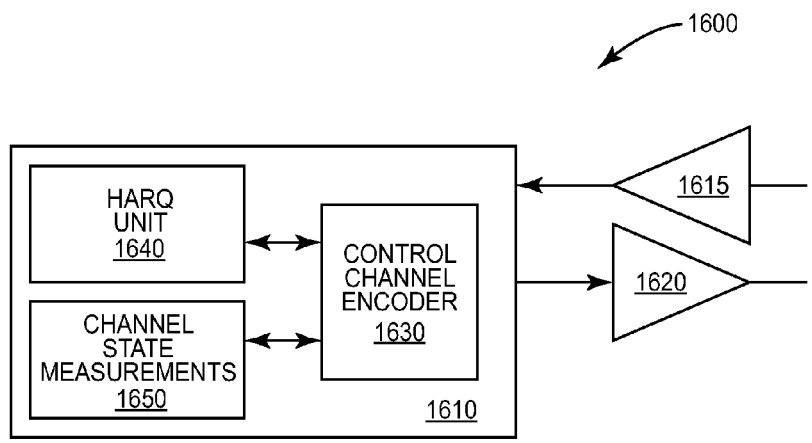
FIG. 16 illustrates functional components of an example mobile terminal.

FIG. 16 illustrates several functional elements of a mobile terminal 1600, adapted to carry out some of the techniques discussed in detail above. Mobile terminal 1600 includes a processing circuit 1610 configured to receive data from a base station, via receiver circuit 1615, and to construct a series of uplink subframes for transmission by transmitter circuit 1620. In several embodiments, processing circuit 1610, which may be constructed in the manner described for the processing circuits 1510 of FIG. 15, includes a hybrid-ARQ processing unit 1640, which is adapted to determine that first channel-state information (from channel-state measurement unit 1650) and first hybrid-ARQ ACK/NACK bits corresponding to a plurality of downlink subframes or a plurality of downlink carriers, or both, are scheduled for transmission in a first uplink subframe, and to determine whether the number of the first hybrid-ARQ ACK/NACK bits is less than a threshold number. Processing circuit 1610 further includes an uplink control channel encoding unit 1630. Thus unit, which may be configured according to the block diagram of FIG. 11, for example, is adapted to encode the hybrid-ARQ ACK/NACK bits and the channel-state information, using separate encoders, to interleave the encoded hybrid-ARQ ACK/NACK bits and the encoded channel-state information bits, and to send both the first channel-state information and the first hybrid-ARQ ACK/NACK bits in physical control channel resources of the first uplink subframe, on a single carrier, in response to determining that the number of hybrid-ARQ ACK/NACK bits to be transmitted in the first uplink subframe is less than the threshold number. Of course, all of the variants of the techniques described above are equally applicable to mobile terminal 1600 as well.

Without changes to current 3GPP specifications, collisions between ACK/NACK transmissions and CSI reports will likely lead to dropped CSI reports. The novel techniques described herein enable simultaneous transmission of multiple ACK/NACK bits and CSI. With the use of these techniques, fewer CSI reports are dropped, which improves link adaptation and increases throughput.

A new PUCCH scheme that enables multi-cell ACK/NACK transmission (including single secondary component carrier ACK/NACK transmission) together with CSI reports has been described. These techniques can be combined with previously standardized control channel behaviors to improve system performance. Thus, for example, a mobile terminal can be configured to either drop CSI if it collides with multi-cell ACK/NACK (legacy behavior) or to use the new PUCCH scheme, which supports simultaneous transmission of multi-cell ACK/NACK and CSI. Configuration may be done using RRC signaling. Similarly, the terminal can be configured to use PUCCH Format 3 for multi-cell ACK/NACK transmission and the new PUCCH scheme to transmit ACK/NACK and CSI bits simultaneously. The same terminal can also be configured to use PUCCH format 2/2a/2b to transmit CSI together with primary component carrier ACK/NACK, while using the new PUCCH scheme to transmit multi-cell ACK/NACK together with CSI.

Another aspect of these techniques relates to a mobile terminal that uses PUCCH format 1b with channel selection to transmit multi-cell ACK/NACK. Even such a mobile terminal should be configured with at least one PUCCH Format 3 resource. This configuration is typically done using RRC signaling. If the mobile terminal has only primary component carrier ACK/NACK and CSI to transmit, the terminal can be configured so that its behavior depends on the Release 8 configuration: i.e., the UE either drops CSI and uses PUCCH Format 1a/1b, or uses PUCCH Format 2/2a/2b to transmit primary component carrier ACK/NACK and CSI simultaneously. Again, if the mobile terminal needs to transmit multi-cell ACK/NACK together with CSI and has a least one PUCCH Format 3 resource configured, it uses the new PUCCH scheme to transmit multi-cell ACK/NACK and CSI simultaneously.

In the event that the UE is configured with PUCCH Format 3 resources, it is possible for the UE to report multi-cell ACK/NACK and periodic CSI together, using the techniques disclosed herein. This enhances the performance of link adaptation as the periodic CSI would in the other case be dropped.

It will be appreciated by the person of skill in the art that various modifications may be made to the above described embodiments without departing from the scope of the present invention. For example, it will be readily appreciated that although the above embodiments are described with reference to parts of a 3GPP network, an embodiment of the present invention will also be applicable to like networks, such as a successor of the 3GPP network, having like functional components. Therefore, in particular, the terms 3GPP and associated or related terms used in the above description and in the enclosed drawings and any appended claims now or in the future are to be interpreted accordingly.

Examples of several embodiments of the present invention have been described in detail above, with reference to the attached illustrations of specific embodiments. Because it is not possible, of course, to describe every conceivable combination of components or techniques, those skilled in the art will appreciate that the present invention can be implemented in other ways than those specifically set forth herein, without departing from essential characteristics of the invention. The present embodiments are thus to be considered in all respects as illustrative and not restrictive.

What is claimed is:

1. A method in a mobile terminal for simultaneous reporting of channel-state information bits and hybrid-ARQ ACK/NACK bits for multiple downlink subframes or multiple downlink carriers, or both, the method comprising:
    encoding the hybrid-ARQ ACK/NACK bits using a first encoder and separately encoding the channel-state information bits using a second encoder, wherein encoding the hybrid-ARQ ACK/NACK bits using the first encoder comprises selecting a number of coded ACK/NACK bits for transmission as a function of a number of hybrid-ARQ ACK/NACK bits for the multiple downlink subframes or multiple downlink carriers, or both, and wherein the selected number of coded ACK/NACK bits depends on a number of hybrid-ARQ ACK/NACK bits after ACK/NACK bundling;
    interleaving the encoded hybrid-ARQ ACK/NACK bits and the encoded channel-state information bits;
    and transmitting the interleaved, encoded bits in physical control channel resources of a first uplink subframe, on a single carrier.

2. The method of claim 1, wherein the interleaved, encoded bits are transmitted in two slots of the first uplink subframe, the two slots having different subcarrier frequencies, and wherein each slot comprises a plurality of the encoded hybrid-ARQ ACK/NACK bits and a plurality of the encoded channel-state information bits.

3. The method of claim 1, wherein the interleaved, encoded bits are grouped into multi-bit modulation symbols for transmission, and wherein the interleaver ensures that each of the multi-bit modulation symbols includes encoded hybrid-ARQ ACK/NACK bits or encoded channel-state information bits, but not both.

4. The method of claim 1, further comprising scrambling the encoded hybrid-ARQ ACK/NACK bits and the encoded channel-state information bits, prior to said interleaving, using one or more configured scrambling sequences.

5. The method of claim 1, further comprising scrambling the interleaved, encoded bits, prior to said transmitting, using one or more configured scrambling sequences.

6. The method of claim 1, further comprising jointly coding a scheduling request bit with the hybrid-ARQ ACK/NACK bits or the channel-state information bits.

7. The method of claim 1, wherein the encoded, interleaved bits are transmitted using a Physical Uplink Control Channel (PUCCH) format 3 resource in a Long-Term Evolution (LTE) wireless system.

8. The method of claim 7, further comprising, for a second uplink subframe for which both a transmission of second channel-state information and a transmission of one or two hybrid-ARQ ACK/NACK bits for a downlink primary cell transmission are scheduled:
    transmitting both the second channel-state information and the one or two hybrid-ARQ ACK/NACK bits for the downlink primary cell transmission, using a pre-configured PUCCH format 2 resource in the second uplink subframe.

9. The method of claim 8, further comprising, for a second uplink subframe for which both a transmission of second channel-state information and a transmission of one or two hybrid-ARQ ACK/NACK bits for a downlink primary cell transmission are scheduled:
    dropping the second channel-state information and transmitting only the one or two hybrid-ARQ ACK/NACK bits for the downlink primary cell transmission, using a PUCCH format 1 resource in the second uplink subframe.

10. The method of claim 1, further comprising first determining that the mobile terminal has been configured, via received signaling, for simultaneous transmission of hybrid-ARQ ACK/NACK bits and periodic channel-state information bits.

11. The method of claim 1, wherein encoding the hybrid-ARQ ACK/NACK bits using the first encoder is followed by rate-matching an initial set of coded ACK/NACK bits to obtain the selected number of coded ACK/NACK bits.

12. The method of claim 11, wherein said rate-matching comprises puncturing of the initial set of coded ACK/NACK bits or cyclic rate-matching of the initial set of coded ACK/NACK bits to obtain the selected number of coded ACK/NACK bits.

13. The method of claim 1, further comprising determining a number of encoded channel-state-information bits for transmission as a function of the selected number of coded ACK/NACK bits for transmission.

14. The method of claim 13, further comprising prioritizing the channel-state information bits and selecting the highest priority channel-state information bits for encoding and transmitting.

15. A mobile terminal configured to simultaneously report channel-state information bits and hybrid-ARQ ACK/NACK bits for multiple downlink subframes or multiple downlink carriers, or both, the mobile terminal comprising a receiver circuit, a transmitter circuit, and a processing circuit, wherein the processing circuit is adapted to:
    encode the hybrid-ARQ ACK/NACK bits using a first encoder and separately encoding the channel-state information bits using a second encoder, wherein encoding the hybrid-ARQ ACK/NACK bits using the first encoder comprises selecting a number of coded ACK/NACK bits for transmission as a function of a number of hybrid-ARQ ACK/NACK bits for the multiple downlink subframes or multiple downlink carriers, or both, and wherein the selected number of coded ACK/NACK bits depends on a number of hybrid-ARQ ACK/NACK bits after ACK/NACK bundling;
    interleave the encoded hybrid-ARQ ACK/NACK bits and the encoded channel-state information bits; and
    send the interleaved, encoded bits to a base station, via the transmitter circuit, in physical control channel resources of a first uplink subframe, on a single carrier.

16. The mobile terminal of claim 15, wherein the processing circuit is adapted to send the interleaved, encoded bits in two slots of the first uplink subframe, the two slots having different subcarrier frequencies, and wherein each slot comprises a plurality of the encoded hybrid-ARQ ACK/NACK bits and a plurality of the encoded channel-state information bits.

17. The mobile terminal of claim 15, wherein the processing circuit is adapted to group the interleaved, encoded bits into multi-bit modulation symbols for transmission and to ensure that each of the multi-bit modulation symbols includes encoded hybrid-ARQ ACK/NACK bits or encoded channel-state information bits, but not both.

18. The mobile terminal of claim 15, wherein the processing circuit is further adapted to scramble the encoded hybrid-ARQ ACK/NACK bits and the encoded channel-state information bits, prior to said interleaving, using one or more cell-specific scrambling sequences.

19. The mobile terminal of claim 15, wherein the processing circuit is further adapted to scramble the interleaved, encoded bits, prior to said transmitting, using one or more cell-specific scrambling sequences.

20. The mobile terminal of claim 15, wherein the processing circuit is further adapted to jointly code a scheduling request bit with the hybrid-ARQ ACK/NACK bits or the channel-state information bits.

21. The mobile terminal of claim 15, wherein processing circuit is adapted to send the encoded, interleaved bits to the base station using a pre-configured Physical Uplink Control Channel (PUCCH) format 3 resource in a Long-Term Evolution (LTE) wireless system.

22. The mobile terminal of claim 21, wherein the processing circuit is further adapted to, for a second uplink subframe for which both a transmission of second channel-state information and a transmission of one or two hybrid-ARQ ACK/NACK bits for a downlink primary cell transmission are scheduled:
    send, to the base station, both the second channel-state information and the one or two hybrid-ARQ ACK/NACK bits for the downlink primary cell transmission, using a pre-configured PUCCH format 2 resource in the second uplink subframe.

23. The mobile terminal of claim 22, wherein the processing circuit is further adapted to, for a second uplink subframe for which both a transmission of second channel-state information and a transmission of one or two hybrid-ARQ ACK/NACK bits for a downlink primary cell transmission are scheduled:
    drop the second channel-state information and send only the one or two hybrid-ARQ ACK/NACK bits for the downlink primary cell transmission to the base station, using a PUCCH format 1 resource in the second uplink subframe.

24. The mobile terminal of claim 15, wherein the processing circuit is further adapted to first determine that the mobile terminal has been configured, via received signaling, for simultaneous transmission of hybrid-ARQ ACK/NACK bits and periodic channel-state information bits.

25. The mobile terminal of claim 15, wherein the processing circuit is adapted to encode the hybrid-ARQ ACK/NACK bits by rate-matching an initial set of coded ACK/NACK bits to obtain the selected number of coded ACK/NACK bits.

26. The mobile terminal of claim 25, wherein said rate-matching comprises puncturing of the initial set of coded ACK/NACK bits or cyclic rate-matching of the initial set of coded ACK/NACK bits to obtain the selected number of coded ACK/NACK bits.

27. The mobile terminal of claim 15, wherein the processing circuit is further adapted to select a number of encoded channel-state-information bits for transmission as a function of the selected number of coded ACK/NACK bits for transmission.

28. The mobile terminal of claim 27, wherein the processing circuit is further adapted to prioritize the channel-state information bits and to select the highest priority channel-state information bits for encoding and transmitting.

* * * * *